United States Patent
Puthenpura et al.

(10) Patent No.: US 8,737,375 B2
(45) Date of Patent: May 27, 2014

(54) CODE PLANNING FOR WIRELESS COMMUNICATIONS

(75) Inventors: Sarat Puthenpura, Berkeley Heights, NJ (US); Mark Austin, Roswell, GA (US); Mark Wade Pack, Cumming, GA (US); Sam Houston Parker, Cranbury, NJ (US); Yuning Yang, Morristown, NJ (US); Wenjie Zhao, Princeton, NJ (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 70 days.

(21) Appl. No.: 13/557,960

(22) Filed: Jul. 25, 2012

(65) Prior Publication Data

US 2014/0029521 A1    Jan. 30, 2014

(51) Int. Cl.
*H04B 7/216* (2006.01)

(52) U.S. Cl.
USPC ............ 370/342; 370/252; 370/338; 370/331

(58) Field of Classification Search
None
See application file for complete search history.

(56) References Cited

U.S. PATENT DOCUMENTS

| | | | |
|---|---|---|---|
| 8,014,362 B2 * | 9/2011 | Panico et al. | 370/335 |
| 8,406,146 B2 * | 3/2013 | Quilty et al. | 370/252 |
| 2008/0039141 A1 | 2/2008 | Claussen et al. | |
| 2008/0181291 A1 | 7/2008 | Zhou et al. | |
| 2009/0047956 A1 | 2/2009 | Moe et al. | |
| 2009/0129448 A1 * | 5/2009 | Koslov et al. | 375/148 |

* cited by examiner

*Primary Examiner* — Duc C Ho
(74) *Attorney, Agent, or Firm* — Amin, Turocy & Watson, LLP

(57) ABSTRACT

Scrambling code conflicts can be mitigated by primary scrambling code reuse that minimizing a potential interference Primary scrambling codes are applied to a first set of cells located in a portion of the network being considered. A second set of cells are evaluated for primary scrambling code reuse based on a distance parameter and/or a coverage area. If the distance parameter is greater than a defined distance, primary scrambling code reuse can be applied. If all distance parameters evaluated are less than the distance parameter, a length of the distance parameter is reduced and the distance between cells is reevaluated.

20 Claims, 18 Drawing Sheets

Cell A, PSC=C2    Cell B, PSC=C2

Cell A, PSC=C2    Cell B, PSC=C2
          1102 — Cell C, PSC=C1

CODE PLANNING FOR WIRELESS COMMUNICATIONS

TECHNICAL FIELD

The subject disclosure relates to wireless communications and, more particularly, to code planning for wireless communications.

BACKGROUND

Wide adoption of mobile devices along with ubiquitous cellular data coverage has resulted in an explosive growth of mobile applications that expect always-accessible wireless networking. This explosion has placed strains on resources that are scarce in the mobile world. On the user side, dropped calls have been blamed for user dissatisfaction. On the network side, instances of dropped calls or poor quality communications can occur due to scrambling code confusion, which can occur when a mobile device encounters two sectors that utilize the same scrambling code.

SUMMARY

A simplified summary is provided herein to help enable a basic or general understanding of various aspects of example, non-limiting embodiments that follow in the more detailed description and the accompanying drawings. This summary is not intended, however, as an extensive or exhaustive overview. Instead, the sole purpose of this summary is to present some concepts related to some example, non-limiting embodiments in a simplified form as a prelude to the more detailed description of the various embodiments that follow. It is also noted that the detailed description may include additional or alternative embodiments beyond those described in this summary.

The disclosed aspects can be configured to assign scrambling codes to cells while verifying that the scrambling codes are not reused within a defined distance or based on other parameters (e.g., actual coverage area of each cell). This assignment of scrambling codes can improve (e.g., maximize) the reuse distance of scrambling codes to minimize a potential interference level. The assignment of scrambling codes as disclosed herein can also mitigate primary scrambling code confusion and/or neighbor conflicts. Further, the disclosed aspects can assign scrambling codes such that radio link failures are mitigated and dropped call performance is improved (e.g., the occurrence of dropped calls is reduced).

These and other aspects or embodiments are described in more detail below.

BRIEF DESCRIPTION OF THE DRAWINGS

Various non-limiting embodiments are further described with reference to the accompanying drawings in which.

DETAILED DESCRIPTION

Figure 1:
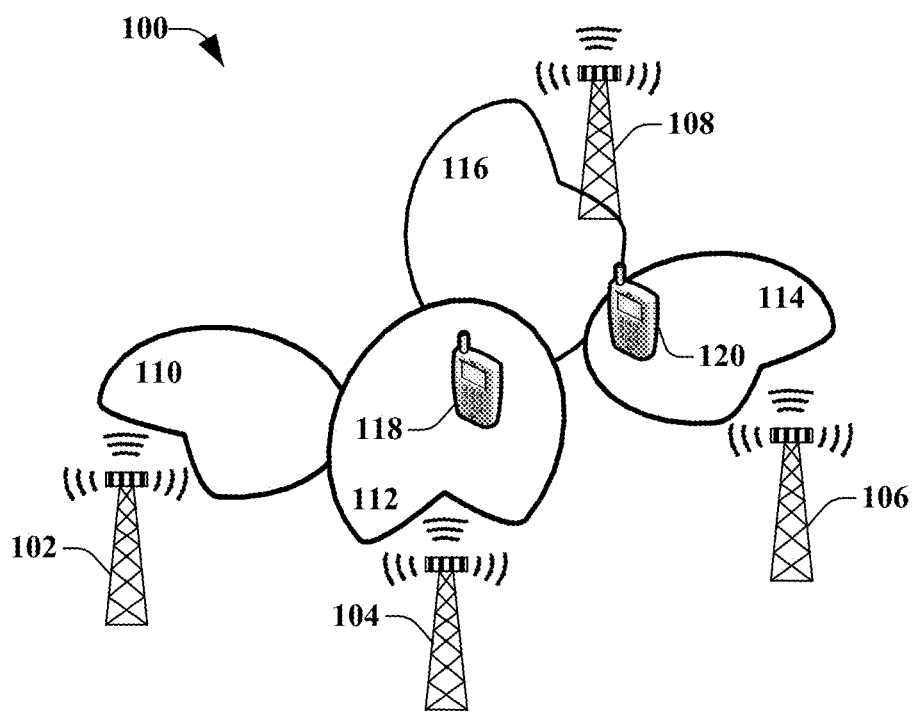
FIG. 1 illustrates an example, non-limiting wireless communications environment in which the disclosed aspects can be utilized, according to an embodiment.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

It is noted that although various aspects and embodiments are discussed herein with respect to Universal Mobile Telecommunications System (UMTS), the subject disclosure is not limited to a UMTS implementation. For example, aspects or features of the disclosed aspects can be exploited in substantially any wireless communication technology. Such wireless communication technologies can include Universal Mobile Telecommunications System (UMTS), Code Division Multiple Access (CDMA), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

In an example embodiment, an aspect relates to a system comprising at least one memory and at least one processor communicatively coupled to the at least one memory. The at least one memory stores computer-executable instructions. The at least one processor facilitates execution of the computer-executable instructions to identify a segment of a wireless communications network for assignment of scrambling codes to a plurality of base stations located within the segment. The at least one processor also facilitates execution of the computer-executable instructions to determine a core of the segment. The core is a portion of the segment comprising at least a pre-defined number of base stations. Further, the at least one processor also facilitates execution of the computer-executable instructions to reserve a first set of scrambling codes of the scrambling codes. The first set of scrambling codes can be reserved for a first set of base stations of the plurality of base stations within the core. The at least one processor also defines a center for the segment. Further, the at least one processor can also facilitate execution of the computer-executable instructions to assign a second set of base stations of the plurality of base stations in the segment. The assignment can be performed in an order based on distances of the second set of base stations from the center. Further, a first base station in the first set of base stations and a second base station of the second set of base stations can be assigned a same scrambling code. Further, the at least one processor facilitates execution of the computer-executable instructions to convey respective scrambling codes to the first set of base stations and the second set of base stations.

Another aspect relates to a method that includes determining, by a system comprising a processor, a first allocation of a first set of primary scrambling codes to a first set of base station of a plurality of base stations located in a populated area of a wireless communications network having at least a pre-defined population. The method also includes determining, by the system, a second allocation of a second set of primary scrambling codes for each base station of a second set of base stations of the plurality of base stations. The determining is based on at least one of a distance between base stations of the plurality of base stations and a coverage area of each base station. Further, the method includes assigning, by the system, the first set of primary scrambling codes to the first set of base stations and the second set of primary scrambling codes to the second set of base stations. Scrambling codes of the first set of primary scrambling codes are reused in the second set of primary scrambling codes.

A further aspect relates to a non-transitory computer-readable storage medium storing computer-executable instructions that, in response to execution, cause a system including a processor to perform operations. The operations include identifying a portion of a network that comprises at least a pre-defined number of base stations and assigning primary scrambling codes to a first set of base stations in the portion of the network. The operations can also include evaluating a second set of base stations in the portion of the network for reuse of the primary scrambling codes. The evaluation can be based on a distance between base stations that are assigned a same scrambling code and a coverage area of each base station. Further, the operations include selectively applying the primary scrambling codes to the second set of base stations as a result of the evaluating. A same primary scrambling code is applied to a first base station in the first set of base stations and a second base station in the second set of base stations.

Referring initially to FIG. 1, illustrated is an example, non-limiting wireless communications environment 100 in which the disclosed aspects can be utilized, according to an embodiment. A wireless communications environment 100 can comprise any number of cells (e.g., sites, sectors, base stations, and so forth). The illustrated wireless communications environment 100 includes a first cell 102, a second cell 104, a third cell 106, and a fourth cell 108, although more (or fewer) than four cell can be utilized in a wireless communications environment. Each cell has a respective geographic area or coverage area. For example, first cell 102 has a first coverage area 110, second cell 104 has a second coverage area 112, third cell 106 has a third coverage area 114, and fourth cell 108 has a fourth coverage area 116.

In an example, the cells can be UTRAN (Universal Terrestrial Radio Access Network) cells. Each cell can be assigned a primary scrambling code (PSC). A PSC is a code utilized to distinguish each cells's transmissions from transmissions from other cells. There can be about 512 available PSCs, numbered 0 through 511. Although each cell should be assigned a unique PSC, since there are a finite number of PSCs and there can be thousands of cells, some reuse of each PSC might be necessary in a wireless communications environment.

Also illustrated in FIG. 1 are two mobile devices, labeled as a first mobile device 118 and a second mobile device 120, although more than two mobile devices can be operated within the wireless communications environment 100. As utilized herein, a mobile device can include a UMTS-based electronic device, such as, but not limited to, a cell phone, a PDA (personal digital assistant), a media player, a digital camera, a media recorder, a laptop, a personal computer, a printer, a scanner, a tablet, a GPS (global positioning system) module, a gaming module, and so forth. Further, the device can also include UMTS-based appliances that can be employed, for example, in a home, office, building, retail store, restaurant, hotel, factory, warehouse, and so on. As previously noted, although the various aspects are discussed herein with reference to UMTS, the aspects are not limited to an UMTS implementation. Instead, the various aspects can be utilized with other network technologies and UMTS technology is utilized herein for purposes of simplicity.

The mobile devices differentiate each of the cells based on the PSC of the cell. Thus, the mobile devices should know the correct PSC of a cell in order to access that cell (e.g., during handoff). For example, PSCs can differentiate WCDMA (Wideband CDMA) radios from one another, as detected by mobile devices (e.g., user equipment). If the mobile device could receive, at the same time, communication from more than one cell (e.g., a first cell and a second cell) assigned the same PSC, confusion (or conflict) can result. In this case, the mobile device might intend to handoff to a specific cell, but is instead handed off to a different cell due to the PSC conflict.

As discussed above, Radio Access Network (RAN) planners have about 512 possible PSCs to assign to each of the radios (e.g., cells). Thus, there can be PSC reuse throughout the various wireless communications networks since a network can have more than about 512 cells. The RAN planners can consider the radios that are located in proximity to each other and attempt to distribute the PSCs so that two or more cells having the same PSC are not able to be detected by a mobile device at the same time (e.g., two cells using the same "scrambling code" interfere with each other).

For convenience, RAN planners might assign the same PSC to all carriers in the same sector. In an example, a base station might have three sectors and, within each sector, there might be four carriers. Among these four carriers, the same PSC might be assigned (e.g., carrier 1 is assigned PSC 200 and, within the same sector, carrier 2 is assigned PSC 200) since there is usually no interference or ambiguity between different carriers. The ambiguity (and thus conflict) exists when PSCs are assigned to cells in the same carrier frequency. As stated, the noted scheduling is a convenience for RAN planners, however, this deployment of PSC reuse might not maximize the reuse distance. This is because a given carrier might only be deployed in a selected area and does not allow for the reuse distance to be extended as far as possible.

The various aspects disclosed herein can provide a direct means to allocate PSCs to each of the cells (e.g., UTRAN cells) while maximizing PSC reuse distance and/or while minimizing the potential interference level. By maximizing the reuse distance (or by minimizing the potential interference level), potential problems can be mitigated, including problems associated with PSC confusion or PSC conflict. The disclosed aspects can also perform PSC planning with considerations for both the distance between the cells and/or azimuth and/or beam width (e.g., coverage area) considerations.

Figure 2:
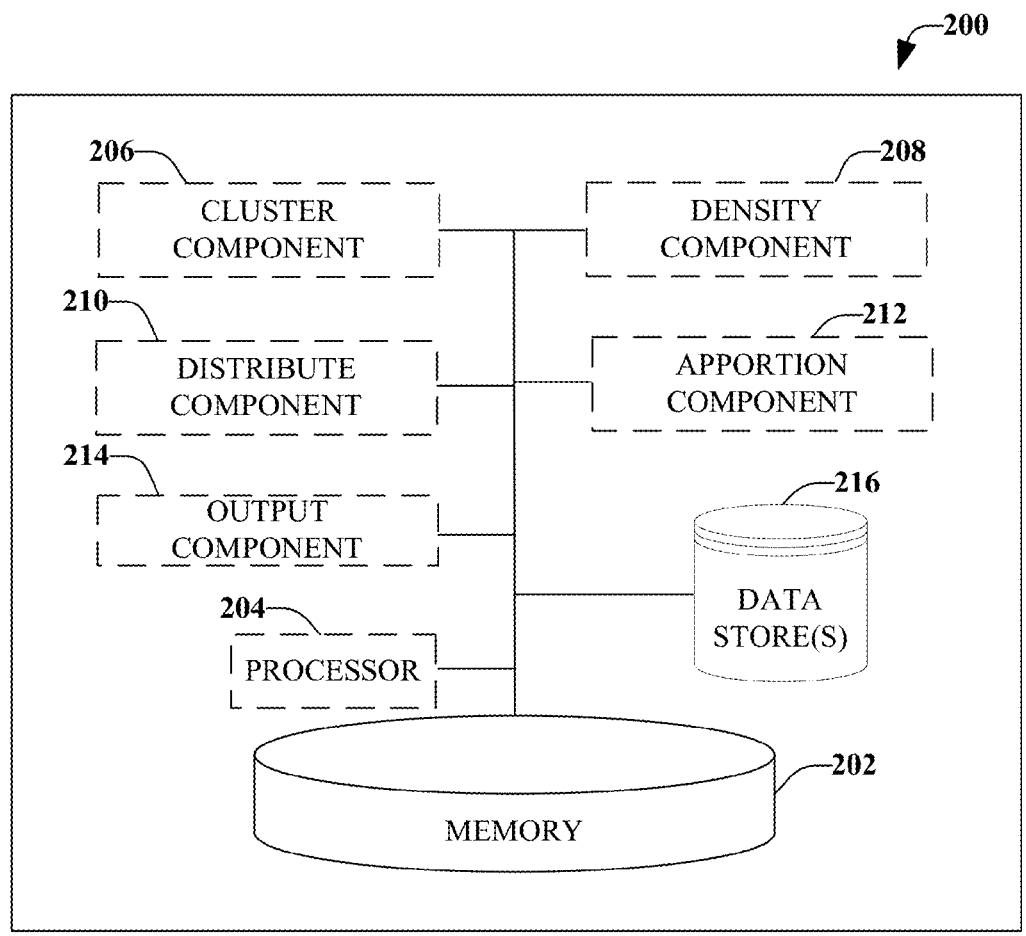
FIG. 2 illustrates an example, non-limiting system configured to allocate primary scrambling codes to cells, according to an aspect.

FIG. 2 illustrates an example, non-limiting system 200 configured to allocate primary scrambling codes to cells, according to an aspect. The allocation of PSCs is performed while minimizing the potential interference level, which can mitigate the occurrence of PSC conflicts. Other benefits of minimizing the potential interference level with the disclosed aspects can include improved network performance and a reduction in the number of dropped calls. Another benefit can be increased busy hour Erlang load capacities, where Erlang is a statistical measure of offered load or carried load on network resources. Other benefits can include improvements in call setup rates and improved handoffs.

In an example, each UTRAN cell can be assigned a unique PSC. UTRAN cells are differentiated by their PSCs and mobile devices should know the correct PSC of a cell in order to access that cell. Further, PSC reuse distance can be maximized to avoid potential problems. Such problems that can occur include PSC "confusion", which occurs when the network cannot identify which cell the mobile device is reporting on. Another problem that can occur is interference among cells sharing the same PSC. Poor PSC planning can result in dropped calls.

PSCs are assigned by RF engineers based on high level engineering rules. This can be performed based on principles to minimize PSC collisions, however, PSCs are assigned on an ad-hoc basis through a manual method. As UTRAN expands coverage, PSC assignment to new cells should take into account other existing cells. Due to the large effort involved, this might be performed by considering immediate neighbor cells only, resulting in a non-optimal PSC plan. To simplify the PSC assignment problem, the same PSC can sometimes be used for all carriers for the same face. Though this provides some degree of simplicity for RF engineers, it can cause sub-optimal PSC assignments. The net results are more dropped calls, more call setup failures, and reduced Erland capacity to the network.

The disclosed aspects provide a PSC tool that can improve the reuse distance, eliminate PSC/neighbor conflicts, reduce radio link failures, and improve the dropped call performance. Further, the disclosed aspects can be utilized to assign scrambling codes to carriers. This can be facilitated by ensuring that PSCs are not reused within an "optimal" distance.

System 200 can be implemented in a network (e.g., base station, access point, sector, NodeB, site, and so forth). As previously noted, although the various aspects are discussed herein with reference to UMTS, the disclosed aspects are not limited to an UMTS implementation. Instead, the various aspects can be utilized with other network technologies and UMTS technology is utilized herein for purposes of simplicity while explaining the various aspects.

System 200 can include at least one memory 202 that can store computer executable components and computer executable instructions. System 200 can also include at least one processor 204, communicatively coupled to the at least one memory 202. The at least one processor 204 can facilitate execution of the computer executable components and instructions stored in the memory 202. It is noted that although one or more computer executable components may be described herein and illustrated as components separate from memory 202 (e.g., operatively connected to memory and operatively connected to each other), in accordance with various embodiments, the one or more computer executable components could be stored in the memory 202. Further, while various components have been illustrated as separate components, it will be appreciated that multiple components can be implemented as a single component, or a single component can be implemented as multiple components, without departing from example embodiments.

System 200 can also include a cluster component 206 that can be configured to identify a segment of a wireless communications network for assignment of PSCs to a plurality of cells located within the segment. For example, the wireless communications environment can include thousands of cells, only four of which are illustrated. Due to the vast number of cells and the finite number of available PSCs (e.g., about 512 PSCs) there might be a need to assign and/or reassign PSCs within the network. Such a need might arise in the case where additional cells or base stations are deployed (e.g., to provide additional network resources for use within the geographic area). In another implementation, the need to reassign PSCs might arise due to the detection of PSC conflicts and/or the presumption of PSC conflicts due to problems within the network (e.g., dropped calls, poor call quality, and so forth).

As indicated, a wireless communications network can include thousands of cells. However, it might not be feasible to assign and/or reassign PSCs to all of the thousands of cells at substantially the same time since the cells are taken offline (e.g., turned off) during at least a portion of the assignment/reassignment process. Thus, cluster component 206 can identify one or more segments for assignment/reassignment of the PSC for cells within the segment. The identified segment can comprise a set of cells, which can be taken offline for the PSC assignment/reassignment process.

In an example, the cluster component 206 can identify the segment based on the different markets and/or based on different teams (e.g., network operators) that are managing the different cells. For example, one team might be working on cells in the Los Angeles market and another team might be working on cells within the San Francisco market or the San Diego market. When the Los Angeles team is ready to perform PSC planning, the team cannot assume that cells within the San Diego or San Francisco market can be changed. Thus, the territory can be defined (e.g., by cluster component 206) and boundaries around that territory can be established. At least a subset of cells within the boundaries can be modified during the PSC assignment/reassignment. Thus, the subset of cells within the boundaries are considered during the PSC planning and cells outside the boundaries can be ignored.

In another implementation, the PSCs associated with cells located outside boundary of the segment of the wireless communication network can be locked and PSC planning is not performed on those cells. Locking the cells close to the region's boundary can isolate the impact of PSC planning to other regions. Further, when PSC planning is performed on the cells within the segment, whose PSCs are not locked, reuse distances of the locked cells (e.g., cells located outside the boundaries) are not considered. In an implementation, to lock the cells a restriction is applied to the PSCs of the cells outside the boundary.

Also included in system 200 is a density component 208 that can be configured to determine a portion of wireless communications network segment that comprises at least a pre-defined number of cells. For example, the pre-defined number of cells can be a portion that comprises the most cells. The portion of the network is referred to as the core of the segment. The portion of the segment (e.g., core) having at least the pre-defined number of cells can be identified first because this can be a difficult portion of the segment in which to assign PSCs. A distribute component 210 can be configured to reserve a first set of PSCs for a first set of cells within the core. Thus, even though the core might have more than about 500 cells, at least about 500 cells can be assigned different PSCs before the need arises to reuse PSCs within that segment.

An apportion component 212 can be configured to assign a second set of PSCs to a second set of cells in the segment. The apportion component 212 can assign the second set of PSCs on a cell by cell basis. Further, the assignment of the second set of PSCs can be in an order based on distances of the second set of cells from a center defined for the segment. In an implementation, the center of the segment can be the center of the core. However, the disclosed aspects are not so limited and the center of the segment can be located elsewhere within the segment, including within the core. The apportion component 212 can also be configured to assign a third (or more) set of PSCs to a third (or more) set of cells in the segment.

The second set of PSCs (and subsequent sets of PSCs) repeat or reuse the same PSCs as the first set of PSCs (e.g., PSC reuse), since there is a finite number of PSCs that can be used. Therefore, in an implementation, the same PSC used within the first set of PSCs and the second set of PSCs are assigned, by the apportion component 212, to a first cell in the first set of cells and to a second cell in the second set of cells in a manner that increases a distance between cells that are assigned a same PSC.

In an implementation, the assignment of the second set of PSCs (and subsequent sets of PSCs) can be based on a distance parameter associated with a current cell being evaluated (e.g., the cells are evaluated on a cell by cell (or individual) basis). In another implementation, if more than one cell from the second set of cells meets the distance parameter, a local random search can be conducted. For example, there is back tracking and a local search performed to determine if a different assignment can be made that increases the distance between cells that are assigned the same PSC or that minimizes a potential interference level.

In a further implementation, if at least one cell fails to satisfy the condition with respect to the distance parameter, a length of the distance parameter can be decreased. In still another implementation, the assignment of the PSCs can include finding at least one PSC based on a distance parameter and a coverage range for the first cell (of the first set of cells) and a second cell (of the second set of cells).

In some implementations, a neighbor violation can be removed if neighbor cells share a common PSC. Thus, if a first cell and a second cell are identified as neighbors (e.g., in a neighbor list), both the first cell and the second cell might not be permitted to share the same PSC. In another implementation, any two cells in a common neighbor list should not be assigned the same PSC. In a further implementation, any two cells in a combined neighbor list of an active set should not be assigned to the same PSC.

In some implementations, cells on a same NodeB can be assigned PSCs such that there is a PSC separation that conforms to a pre-defined separation amount. For example, the pre-defined separation amount can be a minimum number of PSCs that should be located between assigned PSCs. In an example, PSC separation for cells on a same NodeB might be eight. For purposes of this example, a NodeB is treated as a physical tower, however according to various implementations, a tower can have multiple NodeBs. Thus, further to this example, if a first cell on the NodeB is assigned PSC 211, then a second cell (or other cells), on the same NodeB, cannot be assigned PSCs 212, 213, 214, 215, 216, 217, or 218, or more (or PSCs 204, 205, 206, 207, 208, 209 or 210, or less). The pre-defined PSC separation amount can be assigned in order to minimize interference.

An output component 214 can be configured to convey respective PSCs to the first set of cells and the second set of cells (as well as to subsequent sets of cells). For example, after the PSC planning is completed, the output component 214 can cause each cell to be updated with its new PSC. The PSC planning and subsequent assignments can be performed automatically such that dynamic deployment of PSCs can occur on an as need basis or based on other criteria (e.g., potential PSC conflicts have been detected, new cells have been deployed in the network and so forth).

In accordance with some aspects, various information related to PSC assignment can be stored in one or more data store(s) 216 or in another computer readable storage medium. It is noted that a data store can include volatile memory or nonvolatile memory, or can include both volatile memory and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which can operate as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases, and so on) of the various disclosed aspects is intended to comprise, without being limited to, these and any other suitable types of memory. In an aspect, data store(s) 216 is included as a component within the disclosed system(s). However, according to other aspects, the data store(s) 216 can be located remote from the system(s) but can be accessed by the system(s), such as over an air interface.

Figure 3:
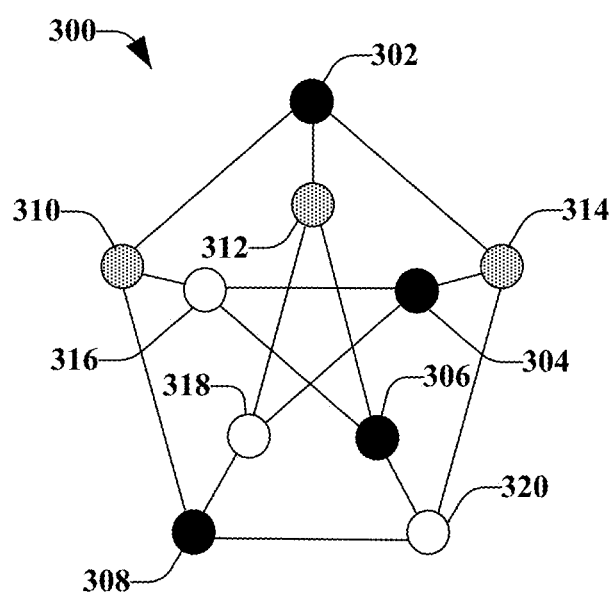
FIG. 3 illustrates scrambling code assignments represented as a graph coloring theory, according to an aspect.

FIG. 3 illustrates scrambling code assignments represented as a graph coloring theory, according to an aspect. Graph coloring is a special case of graph labeling and refers to an assignment of labels, referred to as "colors", to elements of a graph. The assignment of colors can be subject to constraints.

In the example edge coloring graph, colors are assigned to each edge so that adjacent edges do not share the same color.

In further detail, the PSC conflict issue is related to a coloring problem. Vertices, illustrated as circles, represent cells. An edge, illustrated as a line, is defined between two vertices if (and only if) cell distance (or weighted cell distance) is less than a distance parameter, such as a PSC reuse distance. For explanation purposes, the simple graph utilizes three colors. A first color is represented by filled circles 302, 304, 306, and 308. A second color is represented by partially filled circles 310, 312, and 314. A third color is represented by unfilled circles 316, 318, and 320.

For the PSC planning issue, the question is whether the vertices can be colored by 512 colors, such that no two adjacent vertices share the same color. The 512 colors represent the number of PSCs that can be assigned. It should be noted that although generally 512 PSCs are available (e.g., numbered 0 to 511), some PSCs might be reserved and not available for assignment to cells. For example, the available PSCs can be PSCs 0 through 503, PSC 510, and PSC 511 (where PSCs 504 through 509 are reserved).

The graph coloring problem is a NP-Complete equation and thus, exponential time is generally needed to solve the equation by linear programming. Further, in some aspects a heuristic algorithm can be utilized, such as a greedy coloring algorithm, in an attempt to perform PSC planning. For example, greedy coloring can be based on a specific vertices ordering. Further information related to a heuristic approach that can be utilized with the disclosed aspects will be provided below.

Figure 4:
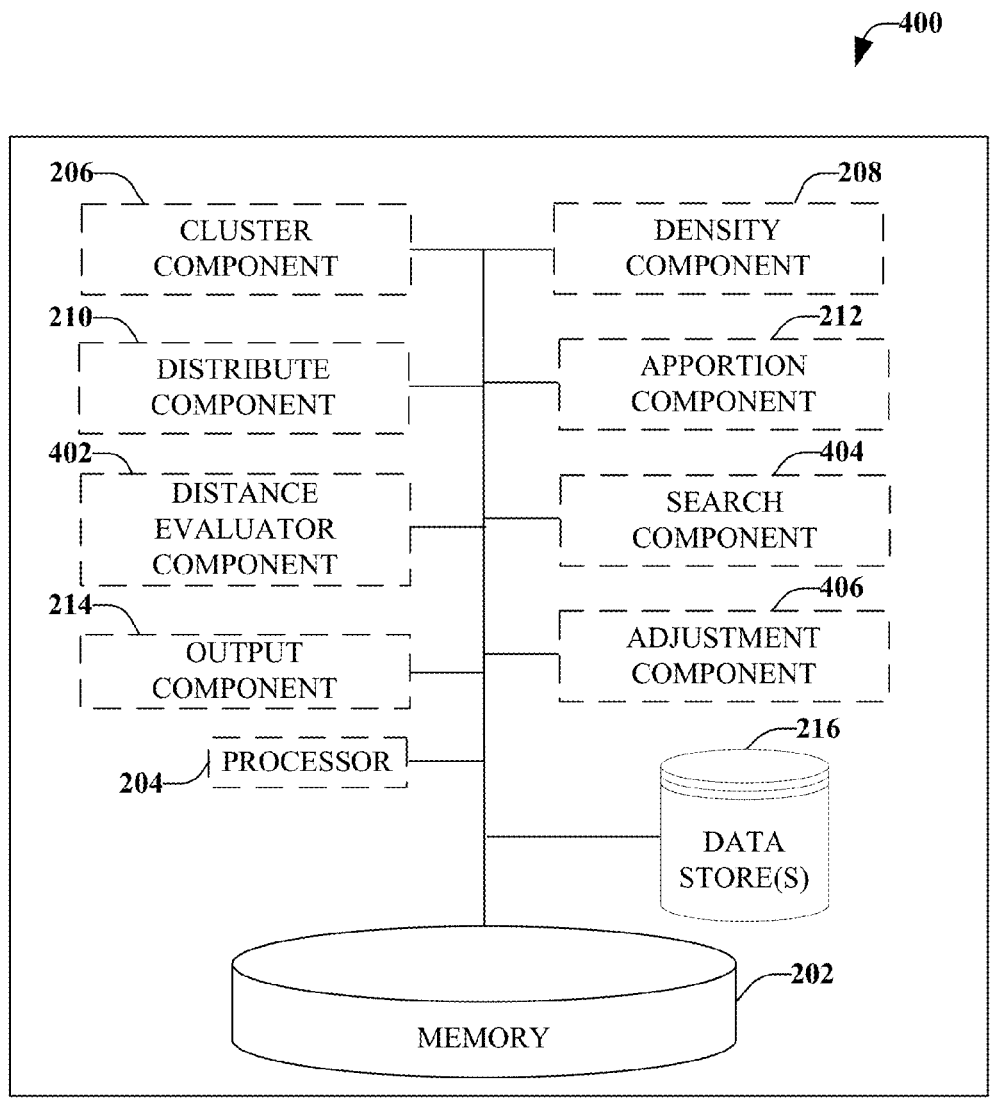
FIG. 4 illustrates another example, non-limiting system for scrambling code planning, according to an aspect.

FIG. 4 illustrates another example, non-limiting system 400 for scrambling code planning, according to an aspect. According to an aspect, system 400 can be configured to minimize a potential interference level during PSC planning. In an example, the interference level can be measured by determining the number of times a given cell site is "detected" when a mobile device is measuring for neighbors. In another example, the interference level can be measured by determining a relative interference between two cells, which can be performed externally (e.g., external tools) or internally (e.g., measurements in the system).

Additionally or alternatively, system can be configured to maximize a PSC reuse distance during PSC planning. Included in system 400 is a distance evaluator component 402 that can be configured to identify at least one PSC based on a distance parameter for a current cell of second set of cells (or subsequent sets of cells).

For example, a cluster component 206 can identify a segment of a wireless communications network for which PSCs are to be assigned and/or reassigned. A density component 208 can determine a portion of the segment that comprises at least a pre-defined number of cells. Further, a distribute component 210 can initialize an assigned pool, which can include assigning a first set of PSCs to cells within the segment. The distribute component 210 can assign, for example, 506 different PSCs to 506 cells in the segment (even if there are more than 506 cells in the segment). As noted, although there can be 512 PSCs available, some of the PSCs might be reserved for other uses and not available for assignment to cells.

In an order based on distances of the second set of cells to the center of the assigned pool, an apportion component 212 can assign a second set of PSCs to the second set of cells in the segment. The second set of PSCs can be assigned to each cell one by one (e.g., on an individual, or cell by cell basis). Depending on the number of cells for which PSCs are to be assigned/reassigned, apportion component 212 can be configured to assign a third set of PSCs to a third set of cells, and so on.

The distance evaluator component 402 can identify at least one PSC that has a reuse distance that is greater than a defined reuse distance for a current cell being evaluated. For example, the distance evaluator component 402 can be configured to ascertain a location of a first cell in the first set of cells (e.g., first cell can be assigned PSC 200) and evaluate a distance between the first cell and a current cell in the second set of cells, where the current cell is the cell under evaluation. If the distance is not greater than the defined reuse distance, the current cell is not assigned the PSC of the first cell (e.g., PSC 200 in this example). In this case, the distance evaluator component 402 proceeds to ascertain a location of a second cell in the first set of cells (e.g., assigned PSC 201) and compares the distance from the second cell to the current cell being evaluated. If the distance is greater than the defined reuse distance, the current cell might be assigned PSC 201. However, if the distance is not greater than the defined reuse distance, a subsequent cell in the first set of cells is evaluated, and so on. If there are multiple PSCs found that satisfy the defined reuse distance, a search component 404 can be configured to perform a local random search.

In an implementation, the distance evaluator component 402 can ascertain the location of each of the cells (in the first set of cells, the second set of cells, and the subsequent set of cells) based on a known location of each of the cells. For example, base stations are placed in a certain geographic area and, generally, are not moved. Thus, the actual location of the base station can be known (e.g., when the base station is installed). These various locations can be populated in a database or by another means that can be accessed by distance evaluator component 402. If there are multiple PSCs found that satisfy the defined reuse distance, a search component 404 can be configured to perform a local random search.

System 400 can also include an adjustment component 406 that can be configured to decrease a defined reuse distance if at least one cell cannot be assigned. In this situation, distance evaluator component 402 can identify at least one PSC that has a reuse distance that is greater than the adjusted (e.g., decreased) defined reuse distance.

In an implementation, PSC assignment can include a mixed integer programming model. According to the programming model the objective function can be to maximize Z (Objective Function: Maximize: Z), which can be subject to various parameters.

A first parameter (or constraint) can be a X-Y relation:

$$2*Y[i,j,k] \leq X[i,k]+X[j,k], \forall i,j \in \text{CELL}, i \neq j; \forall k \in \text{PSC}$$

where X[i, k] is a binary variable; X[i, k]=1 when cell i is assigned to PSC k, otherwise X[i, k]=0. Y[i, j, k] is a binary varaible; Z is a continuous variable, minimum distance between cells assigned by same code. CELL is a set of cells; PSC is a set of PSCs (e.g., 506 codes).

A second parameter (or constraint) can be that there is one PSC per cell. According to this constraint, a cell i is assigned to only one PSC, which can be represented as:

$$\sum_{k \in PSC} X[i,k] = 1, \quad \forall\, i \in \text{CELL}$$

A third parameter (or constraint) can be a lower bound constraint, which can be represented as:

$$\text{Dist}[i,j]*Y[i,j,k] \geq Z, \forall i,j \in \text{CELL and } \forall k \in \text{PSC}$$

where Dist[i, j] is the Parameter of the distance between cell i and cell j, pre-calculated.

The first constraint can define the logical relation between variable X and variable Y. The first constraint (combined with objective function) can imply that:

$Y[i,j,k]=1$ when $X[i,k]=1$ and $x[j,k]=1$; otherwise $Y[i,j,k]=0$

Figure 5:
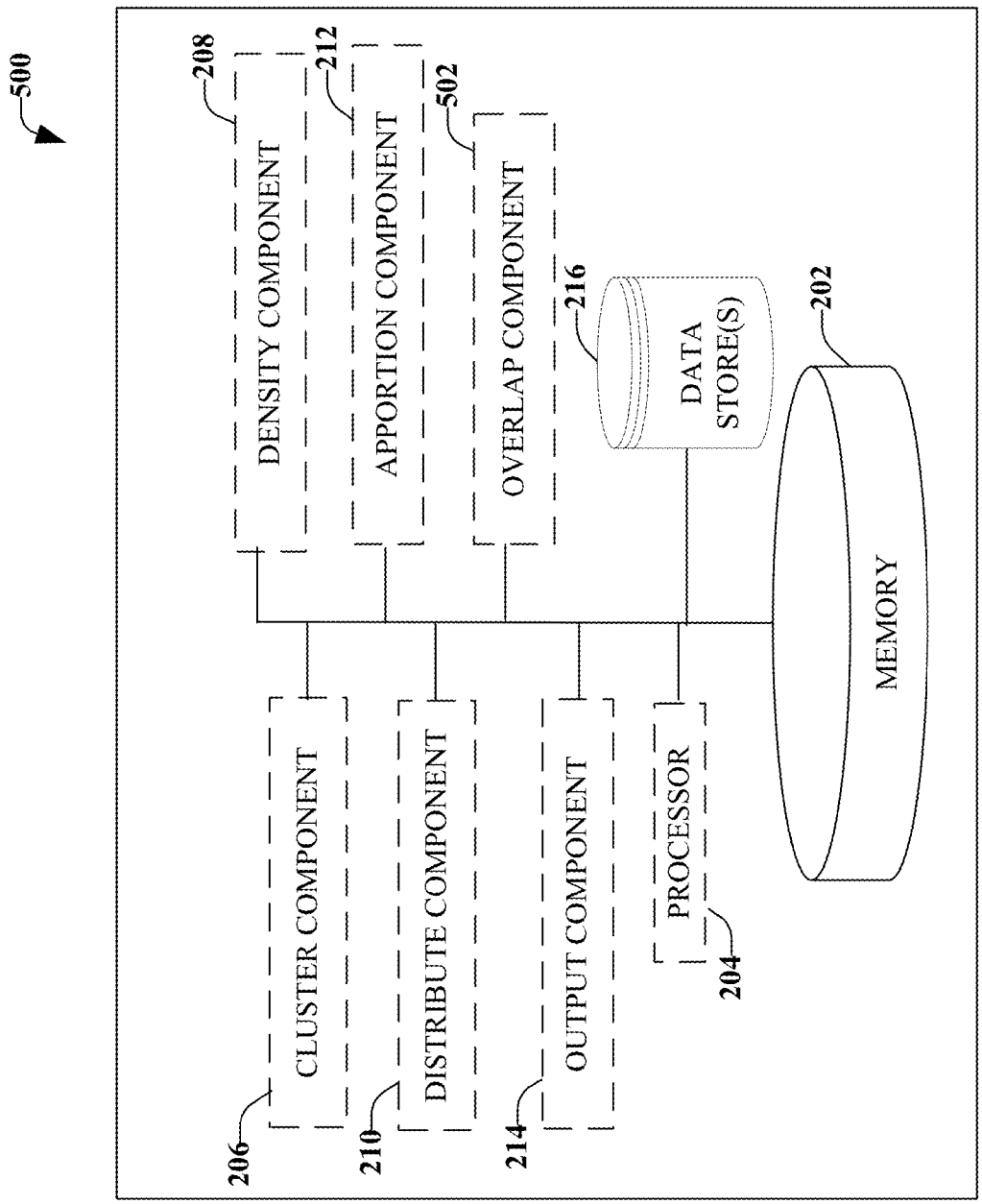
FIG. 5 illustrates an example, non-limiting system for considering distance and coverage range for scrambling code planning, according to an aspect.

FIG. 5 illustrates an example, non-limiting system 500 for considering distance and coverage range for scrambling code planning, according to an aspect. Included in system is an overlap component 502 that can be configured to evaluate a coverage range of each cell and incorporate the evaluation in the PSC planning considerations. For example, overlap component 502 can be configured to utilize a cell's azimuth and beam width to determine an overlapping coverage area of two or more cells that are being considered during PSC planning.

In some cases, distance is not the sole criteria that should be used to push the reuse distance as far as possible (e.g., maximize reuse distance, increase a distance between cells that are assigned a same scrambling code) to minimize a potential interference level. Thus, distance might not be the final criteria used during PSC planning. For example, in dense urban settings, user locations (e.g., mobile device locations) can vary by various geographic coordinates including latitude, longitude, and altitude (e.g., three-dimensions). In many cities (e.g., Manhattan, Los Angeles, San Francisco, Chicago, and so forth), numerous small footprint sites exist to cover smaller areas. Users, through their respective mobile devices, might be more prone to see many sites both near and far away due to tall buildings, hilltops, and so forth. With the higher penetration of sites in smaller geographic areas, PSC reuse can become difficult to configure. Thus, according to an implementation, both distance and coverage area can be considered during the PSC planning.

For example, a base station might have two cells that are close to each other. If the cells are facing away from each, even if the physical distance between the cells is small, there might not be any actual interference because the beams are covering different areas. On the other hand, there might be two cells that are physically far away from each other, however, although the cells are far apart, due to the propagation model, the cells might actually interfere with each other.

With reference to the color graph problem discussed above, the two distance and beamforming scenarios can be represented as removing edges or by adding extra edges to the color graph. For example, an edge can be added if the cells are far away from each other but, due to the real or actual coverage area, the cells actually do interfere. If the cells are physically close but do not interfere, an edge can be removed. Thus, an edge can be defined based on an actual coverage of the cells. This can be more accurate than using distance as the only criteria.

Figure 6:
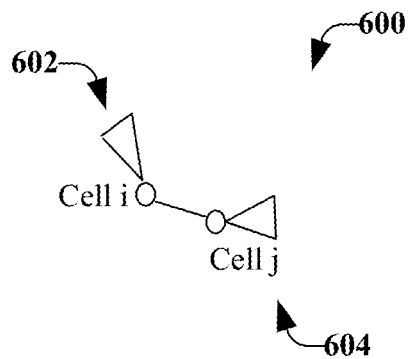
FIG. 6 illustrates a first case where an overlap factor is equal to 1, according to an aspect.
Figure 7:
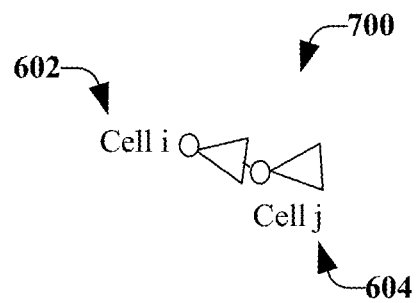
FIG. 7 illustrates a second case having an overlap factor equal to 1.25, according to an aspect.
Figure 8:
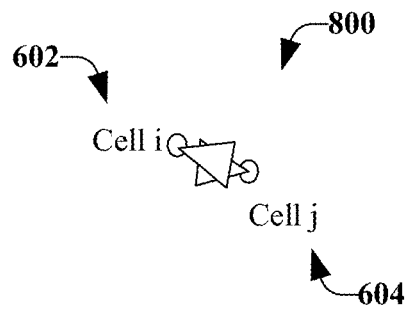
FIG. 8 illustrates a third case, which has as overlap factor equal to 1.5, according to an aspect.

FIGS. 6-8 illustrate schematic representations of three cases where the primary scrambling code reuse distance depends on coverage or overlap between two cells, according to an aspect. Instead of the defined PSC reuse distance being a universal value, a binary indicator $U(i,j)$ can be calculated based on radio frequency (RF) coverage, where $U(i,j)=1$ indicates that cell i and cell j are not interfering with each other based on a coverage map, even if assigned the same PSC. Otherwise, $U(i,j)=0$. In the colored graph representation discussed above, the edge is defined if (and only if) $U(i,j)=0$.

Illustrated in each of the three cases of FIGS. 6-8 are two cells, Cell i 602 and Cell j 604. FIG. 6 illustrates a first case 600 where an overlap factor is equal to 1, according to an aspect. In this case, the weighted distance of Cell i 602 and Cell j 604 is the distance between the cells divided by the overlap factor of the cells, which can be expressed as:

$$\text{weighted\_dist}(i,j)=\text{dist}(i,j)/\text{overlap\_factor}(i,j)$$

FIG. 7 illustrates a second case 700 having an overlap factor equal to 1.25, according to an aspect. In this case, the distance between the cells replaces the weighted distance. Thus, the distance between the cells equals the distance between the cells divided by the overlap factor of the cells, which can be expressed as:

$$\text{dist}(i,j)=\text{dist}(i,j)/\text{overlap\_factor}(i,j)$$

FIG. 8 illustrates a third case 800, which has as overlap factor equal to 1.5, according to an aspect. In the second case 700 of FIG. 7 and the third case 800 of FIG. 8, the overlap factors of 1.25 and 1.5, respectively, are adjustable factors. According to an implementation, the parameters can be obtained by sophisticated path loss and propagation calculations.

In an example, ATOLL cell coverage can be incorporated. A recommended PSC reuse distance should not be a universal value. Instead, the PSC reuse distance should depend on cell coverage between two cells. For example, a binary indicator $U(i,j)$ can be calculated based on ATOLL predicted coverage. $U(i,j)$ means that cell i and cell j are not interfering with each other based on ATOLL, even if the same PSC code is assigned. It is zero otherwise. In the graph representation, the edge is defined if (and only if) $U(i,j)$ is equal to zero.

Figure 9:
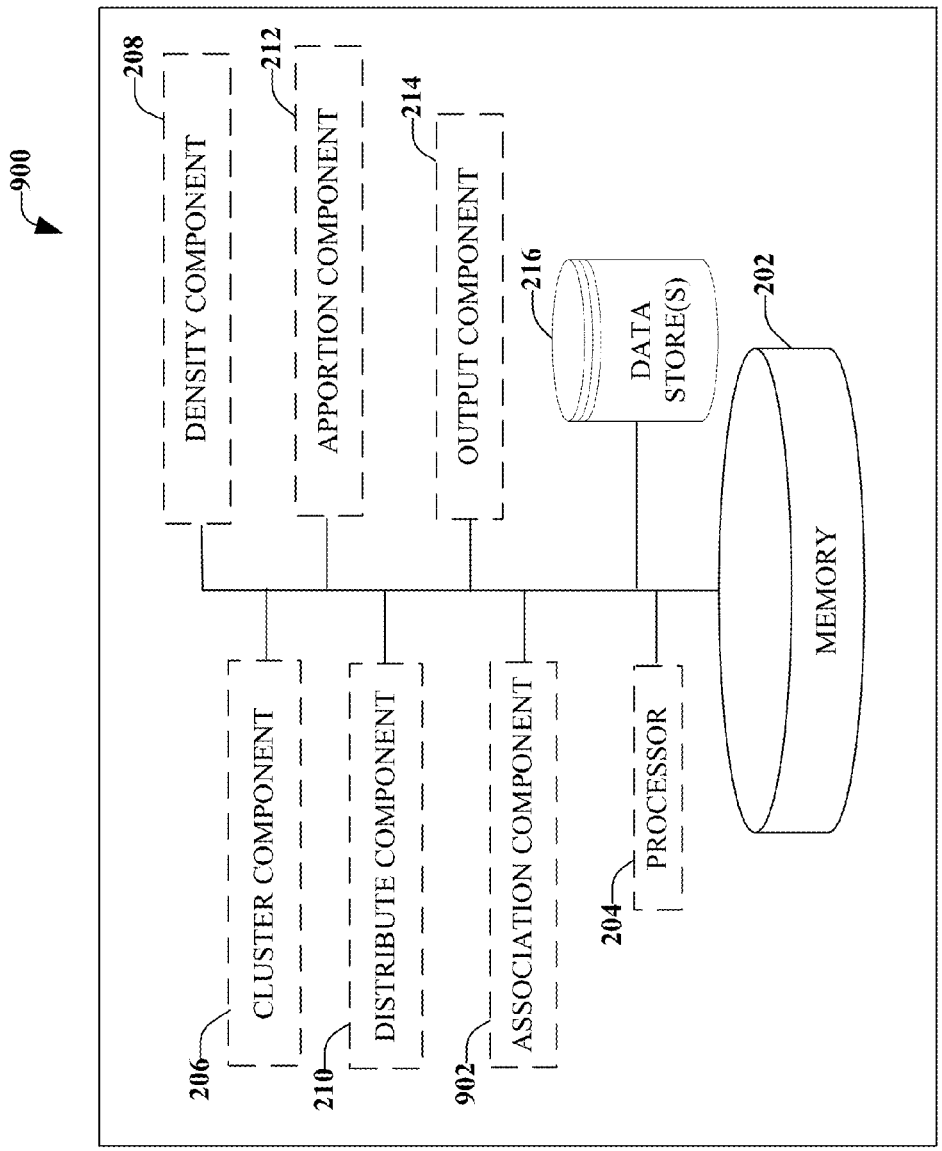
FIG. 9 illustrates an example, non-limiting system for considering neighbor relations during scrambling code planning, according to an aspect.

FIG. 9 illustrates an example, non-limiting system 900 for considering neighbor relations during scrambling code planning, according to an aspect. System 900 can include an association component 902 that can be configured to evaluate a neighbor relation between two or more cells and remove a neighbor PSC violation based on the evaluation. Removing the neighbor PSC violation can include reconfiguring a primary scrambling code in response to a determination that at least two cells are defined as neighbors and share a common primary scrambling code.

In an implementation, association component 902 can determine whether a first cell and a second cell are defined as neighbors. For example, the association component 902 can access one or more neighbor lists (intra-frequency and/or inter-frequency) to make the determination. A neighbor list is a table that associates each sector or cell with its neighboring sectors and which a mobile device can use to initiate a handover request. The neighbor list can be stored in a database or memory, for example.

In an implementation, association component 902 can be configured to reconfigure a PSC assignment if neighbor cells share a common PSC. In another implementation, association component 902 can be configured to reconfigure a PSC assignment if two cells share a common PSC and are defined as neighbors of a third cell.

Figure 10:
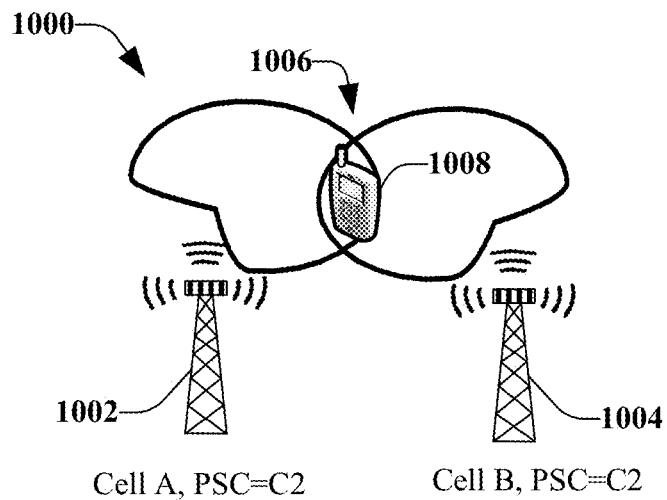
FIG. 10 illustrates an example wireless communications network comprising two cells, according to an aspect.

For example, FIG. 10 illustrates an example wireless communications network 1000 comprising two cells, Cell A 1002 and Cell B 1004, according to an aspect. As illustrated, Cell A 1002 and Cell B 1004 are in close proximity and their respective geographic areas overlap, as indicated at 1006. In this scenario, the PSCs for the cells were not assigned properly and both Cell A 1002 and Cell B were assigned PSC C2. Since these cells are neighbors, a mobile device 1008 might be in the overlapping coverage area 1006 of the cells and can receive communications from both cells. In this case, a conflict is created because the mobile device 1008 has been provided the same identifier (e.g., PSC C2) for both cells. Thus, the mobile device 1008 cannot properly identify which cell it is communicating with and/or might be communicating with both cells but the communication is not synchronized. Further, the mobile device 1008 might not be aware that the two cells are in conflict. This scenario can result in dropped calls and/or high block error rate as well as other communication problems. For example, the network is unable to identify which cell the mobile device is reporting on. Thus, the mobile attempts to decode both of them, resulting in a high Block Error Rate (BLER)

Figure 11:
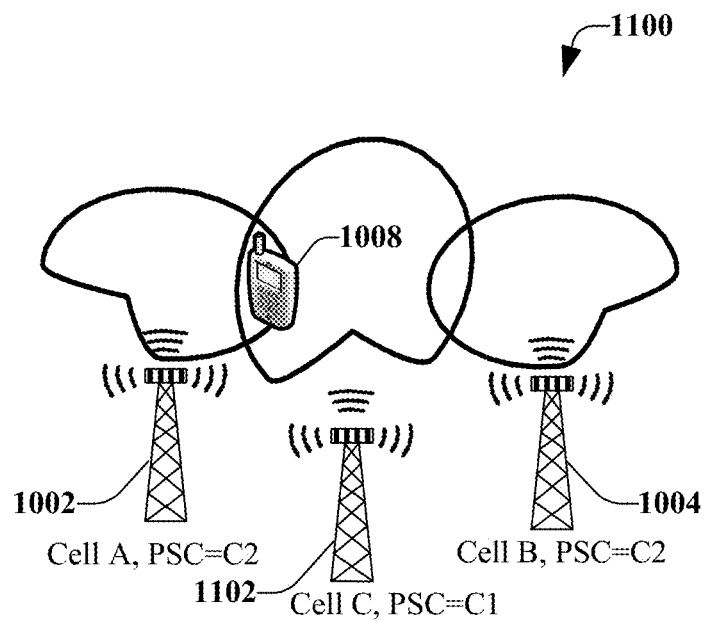
FIG. 11 illustrates, a potential scrambling code conflict issue within a wireless communications network, according to an aspect.

Additionally or alternatively, a neighbor violation can be removed if two cells share a common primary PSC and are defined as neighbors of a third cell. For example, FIG. 11 illustrates, a potential scrambling code conflict issue within a wireless communications network 1100, according to an aspect. As illustrated, Cell A 1002 and Cell B 1004 have been assigned the same PSC, C2. In this scenario, Cell A 1002 and Cell B 1004 are not neighbors. However, Cell C 1102, which has been assigned PSC C1, is a neighbor of both Cell A 1002 and Cell B 1004. For example, Cell C 1102 can have a neighbor list that identifies both Cell A 1002 and Cell B 1004, as well as other cells, as candidates for the mobile device to handover to. As illustrated, the mobile device 1008 can be located in an overlapping coverage area between Cell C 1102 and Cell A 1002 and intends to handover to Cell A 1002 and identifies this cell with PSC C2. Since Cell C 1102 has two neighboring cells identified with PSC C2, mobile device 1008 can handoff to either Cell A 1002 or to Cell B 1004. In this case, Cell C 1102 might believe mobile device 1008 intends to handover to Cell B 1104 and facilitates such handover, which can result in a dropped communication.

The PSC conflict illustrated in FIG. 11 can cause dropped calls by the mobile device 1008 and/or other communication issues. For example, the network can become confused as to the "real" neighbor of the mobile device on Cell C. Thus, the mobile device could handoff to the wrong neighbor, resulting in dropped calls.

Figure 12:
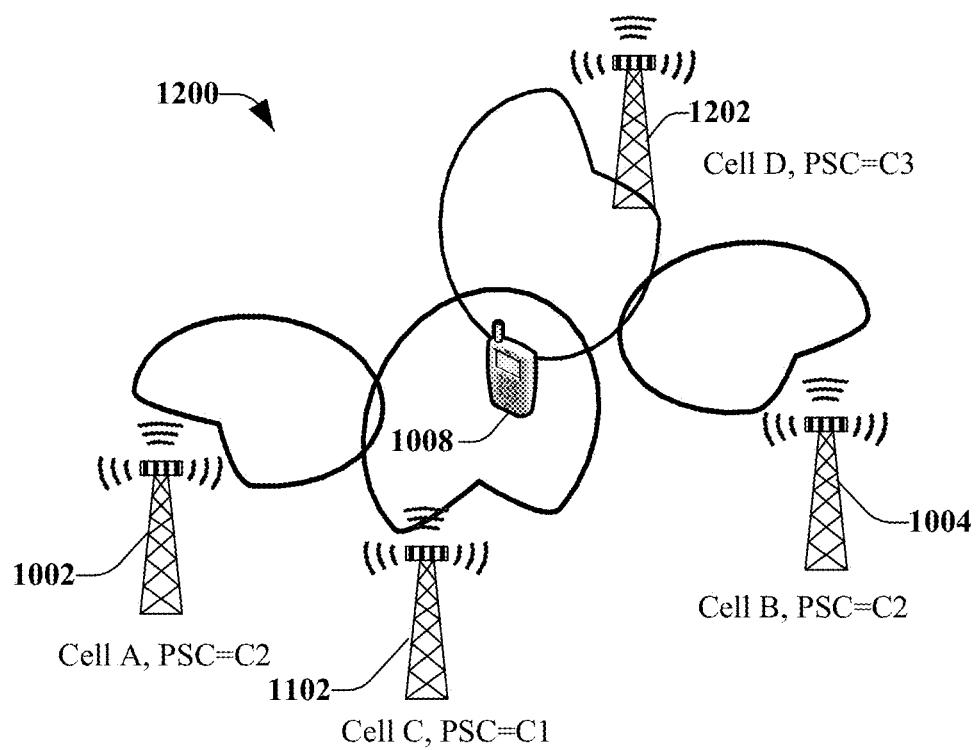
FIG. 12 is another example wireless communications network illustrating another scrambling code conflict issue, according to an aspect.

FIG. 12 is another example wireless communications network 1200 illustrating another scrambling code conflict issue, according to an aspect. In this case, Cell A 1002 and Cell B 1004 have been assigned PSC C2; Cell C 1102 has been assigned PSC C1; and Cell D 1202 has been assigned PSC C3. In this case, mobile device 1008 is between Cell C 1102 and Cell D 1202 and would like to handoff. Since Cell A 1002 and Cell B 1004 are assigned the same PSC, the potential for PSC conflict occurs and mobile device 1008 could hand off to the unintended cell.

As illustrated in FIG. 12, the neighbors of the active set have the same PSC. For example, the combined neighbor list for active set (Cell C and Cell D) has neighbors (Cell A, Cell B) with common PSCs. This can result in the inability to distinguish between Cell A, Cell B, which can cause a higher probability of dropped calls.

Figure 13:
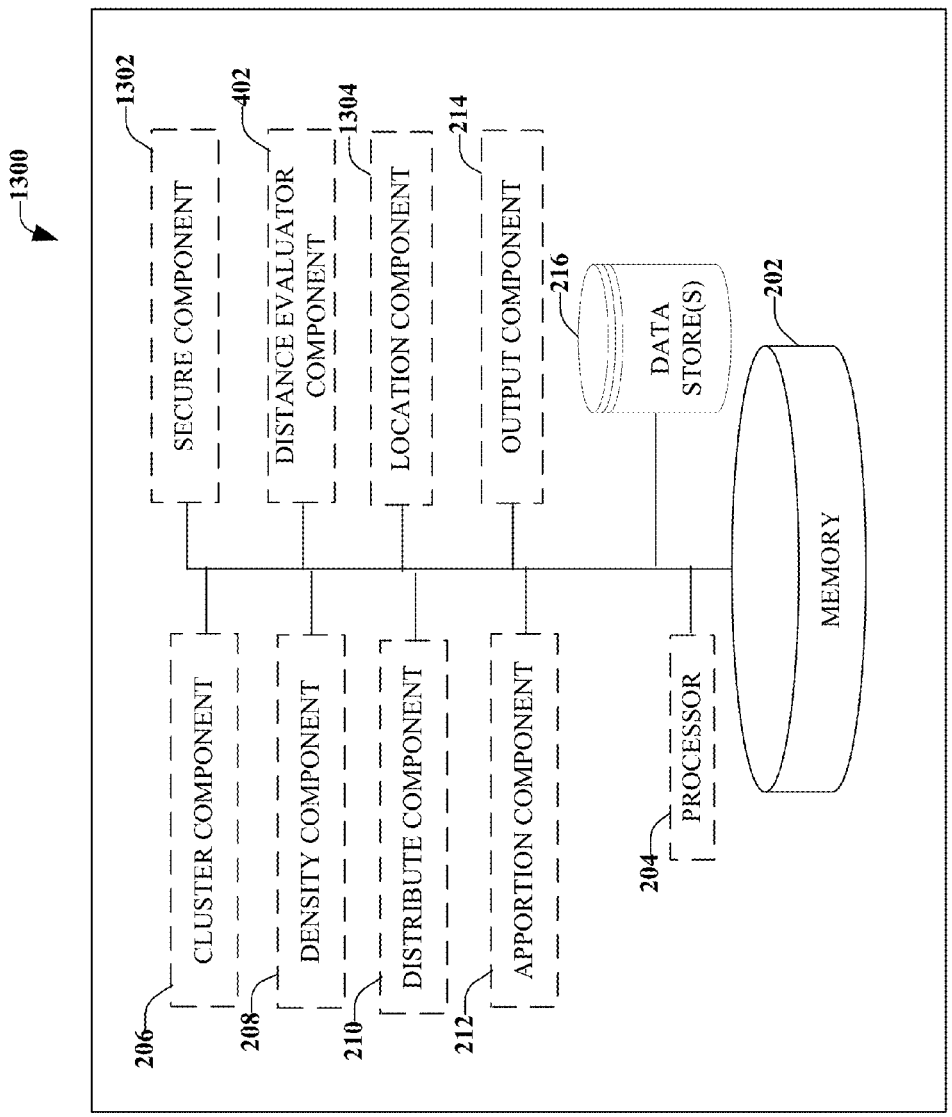
FIG. 13 illustrates an example, non-limiting system for scrambling code allocation while accounting for various constraints, according to an aspect.

FIG. 13 illustrates an example, non-limiting system 1300 for scrambling code allocation while accounting for various constraints, according to an aspect. In an implementation, a cluster component 206 can be configured to identify a segment of a wireless communications network for assignment of PSCs to a plurality of cells located within the segment. System 1300 can also include a secure component 1302 that can be configured to apply a restriction to a third set of cells located outside a boundary of the identified segment.

For example, since cells for which PSCs are being assigned and/or reassigned might be taken off line in order for the updates to be performed, only portions of a wireless communications network might be updated at a given time. Thus, the PSCs of cells close to a region's boundary can be restricted from being changed in order to isolate the impact of assignment/reassignment of PSCs to other regions.

System 1300 also includes a density component 208 that can be configured to determine a core (e.g., area comprising at least a pre-defined number of cells) of the segment. A distribute component 210 can be configured to reserve a first set of PSCs for a first set of cells within the core. An apportion component 212 can be configured to assign, in an order based on distances of the second set of cells from a center of the segment, a second set of PSCs to the second set of cells in the segment on a cell by cell basis. The center of the segment can be defined before the assignment or at substantially the same time as the assignment.

In an implementation, a distance evaluator component 402 can be configured to identify at least one PSC based on a distance parameter for a current cell of a second set of cells. The distance evaluator component 402 also can be configured to ignore a reuse distance between the cells whose PSCs are restricted from being changes (e.g., locked). Ignoring the reuse distance can include bypassing assignment of one or more PSCs based on a distance between the third set of cells and the second set of cells, for example.

Additionally or alternatively, system 1300 can include a location component 1304 that can be configured to determine a geographic location of each cell. Cells that are at the same physical location (e.g., NodeB) can be identified by location component 1304. The cells at the same NodeB, for example, can have a pre-defined separation amount. Thus, when a PSC is assigned to each of the cells on the same NodeB, each cell can be assigned a PSC such that each cell has a PSC separation that confirms to the pre-defined separation amount. In an example, the pre-defined PSC separation amount is eight, however, according to some aspects, a different pre-defined PSC amount can be utilized. Further, when a cell is being added to the assigned pool, co-NodeB cells already in the pool can be checked to verify that a PSC separation amount is in conformance with the pre-defined separation amount.

Figure 14:
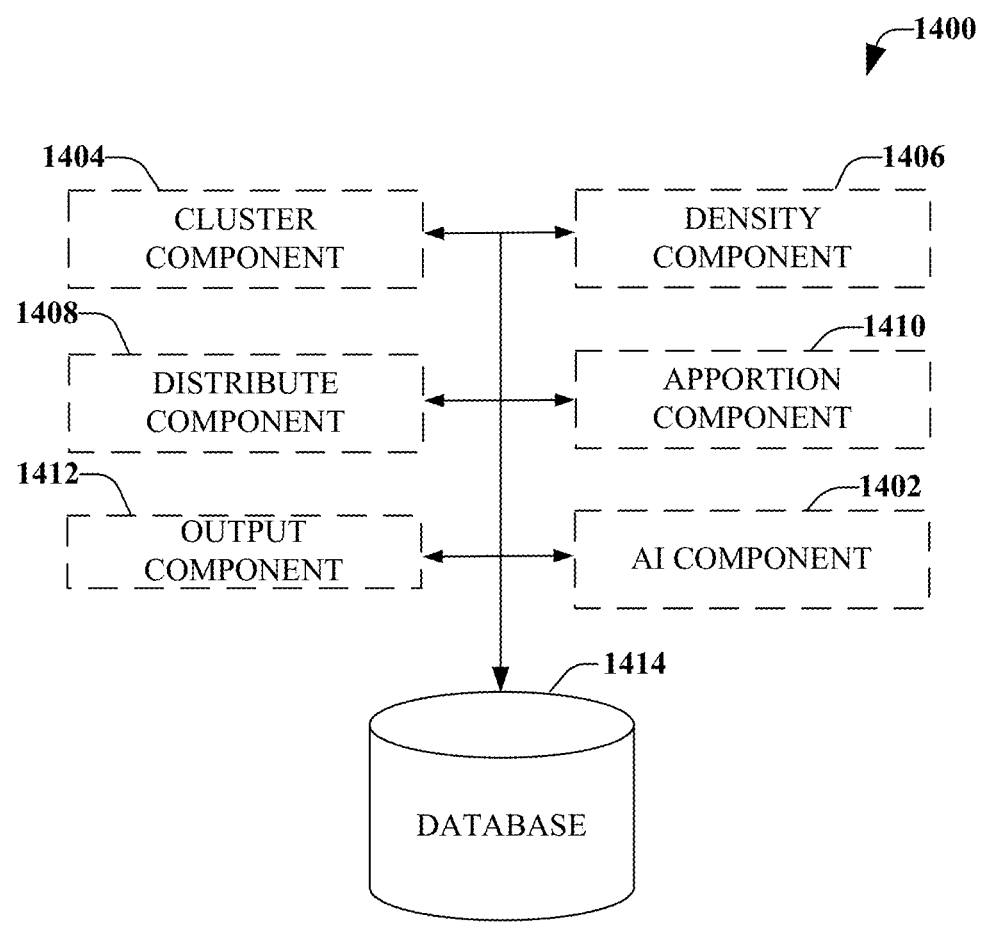
FIG. 14 illustrates an example, non-limiting system that employs an artificial intelligence component, which facilitates automating one or more features in accordance with the disclosed aspects.

FIG. 14 illustrates an example, non-limiting system 1400 that employs an artificial intelligence (AI) component 1402, which facilitates automating one or more features in accordance with the disclosed aspects. A cluster component 1404, a density component 1406, a distribute component 1408, an apportion component 1410, an output component 1412, a database 1414, as well as other components (not illustrated) can include functionality, as more fully described herein, for example, with regard to the previous figures. The disclosed aspects (e.g., in connection with PSC planning) can employ various AI-based schemes for carrying out various aspects thereof. For example, a process for planning PSC assignments based on minimizing a potential interference level and/or maximizing PSC reuse can be facilitated through an example automatic classifier system and process.

An example classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that should be automatically performed. In the case of communication systems, for example, attributes can be information stored in database 1414, and the classes can be categories or areas of interest (e.g., distances between cell pairs, coverage areas of each cell).

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

As will be readily noted, the disclosed aspects can employ classifiers that are explicitly trained (e.g., through a generic training data) as well as implicitly trained (e.g., through observing PSC reuse, observing distances between cells, receiving extrinsic information, retrieving intrinsic information and so on). For example, SVMs can be configured through a learning or training phase within a classifier constructor and feature selection module. Thus, the classifier(s) can be used to automatically learn and perform a number of functions, including but not limited to assigning PSCs to cells such that minimizing a potential interference level and/or maximum reuse distance is achieved. The criteria can include, but is not limited to, distances between cells, actual coverage area of each cell, consideration of one or more constraints, and so on.

In view of the example systems shown and described herein, methods that may be implemented in accordance with the one or more of the disclosed aspects, will be better understood with reference to the following flow charts. While, for purposes of simplicity of explanation, the methods are shown and described as a series of blocks, it is to be understood that the disclosed aspects are not limited by the number or order of blocks, as some blocks may occur in different orders and/or at substantially the same time with other blocks from what is depicted and described herein. Moreover, not all illustrated blocks may be required to implement the methods described hereinafter. It is noted that the functionality associated with the blocks may be implemented by software, hardware, a combination thereof or any other suitable means (e.g. device, system, process, component, and so forth). Additionally, it is also noted that the methods disclosed hereinafter and throughout this specification are capable of being stored on an article of manufacture to facilitate transporting and transferring such methodologies to various devices. Those skilled in the art will understand that a method could alternatively be represented as a series of interrelated states or events, such as in a state diagram. The various methods disclosed herein can be performed by a system comprising at least one processor.

Figure 15:
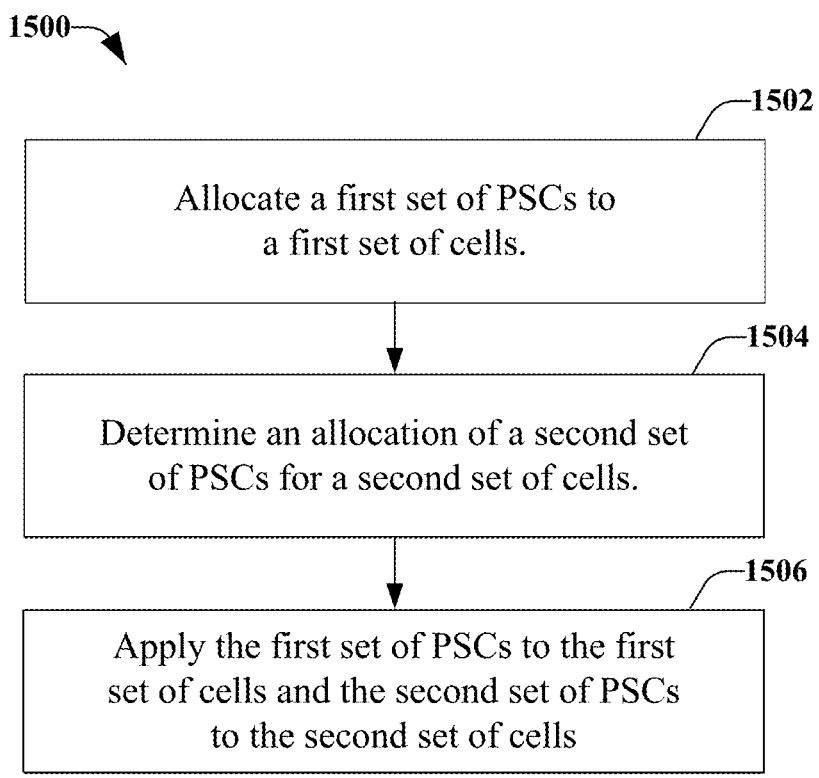
FIG. 15 illustrates an example, non-limiting method for primary scrambling code reuse planning, according to an aspect.

FIG. 15 illustrates an example, non-limiting method 1500 for primary scrambling code reuse planning, according to an aspect. Method 1500 starts, at 1502, with determining a first allocation of a first set of PSCs to a first set of cells located in an area of a wireless communications network having at least a pre-defined population. At 1504, a second allocation of a second set of PSCs for a second set of cells is determined. The determination of the second allocation can be performed individually for each cell in the second set of cells. Further, the determination of the second allocation can be based on at least one of a distance between cells of the plurality of cells and a coverage area.

The first set of PSCs are assigned to the first set of cells and the second set of PSCs are assigned to the second set of cells, at 1506. Each cell in the first set of cells and the second set of cells is assigned a PSC. A first cell in the first set of cells and a second cell in the second set of cells are assigned a same scrambling code (e.g., scrambling code reuse).

According to an aspect, method can include identifying that the first cell and the second cell are defined as neighbors that share a PSC. Further to this aspect, the PSC of the first cell or the second cell is changed based in part on the neighbor definition. According to another aspect, method can include identifying that the first cell and the second cell are defined as neighbors by a third cell, wherein the first cell and the second cell are assigned the same PSC. Further to this aspect, the method can include changing the PSC of the first cell or the second cell as a function of the identifying.

Figure 16:
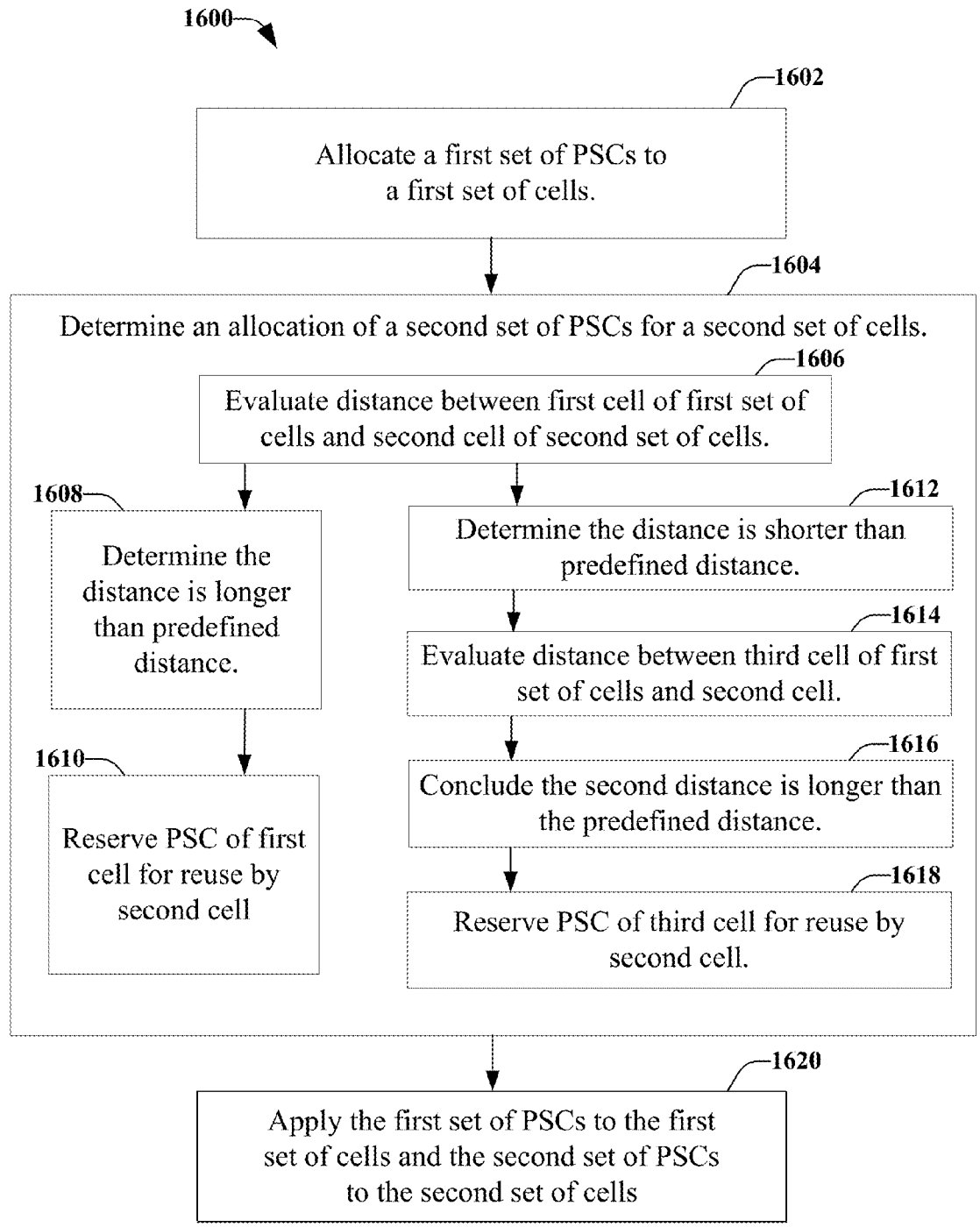
FIG. 16 illustrates an example, non-limiting method for maximizing primary scrambling code reuse distance, according to an aspect.

FIG. 16 illustrates an example, non-limiting method 1600 for maximizing primary scrambling code reuse distance, according to an aspect. Maximizing the reuse distance can mitigate two cells from using the same scrambling when they would interfere with each other. At 1602, a first set of PSCs is allocated to a first set of cells. The first set of cells can be located in a populated area of a wireless communications network. At 1604, an allocation of a second set of PSCs are determined for a second set of cells. The determination can be performed individually on a cell by cell basis.

According to an aspect, the determination includes determining, at 1606, the distance between a first cell of the first set of cells and a second cell of the second set of cells. At 1608, a determination is made that the distance is greater than a pre-defined distance. Thus, at 1610, the PSC of the first cell is reserved for reuse by the second cell.

In accordance with some aspects, the determination includes measuring, at 1606, the distance between a first cell of the first set of cells and a second cell of the second set of cells. Based on this measurement, a determination is made, at 1612, that the distance is less than a predefined distance. Thus, at 1614, a second distance between a third cell of the first set of cells and the second cell is evaluated. At 1616, it can be concluded that the second distance is greater than the predefined distance. At 1618, the PSC of the third cell is reserved for use by the second cell.

Method continues, at 1620, when the first set of PSCs is applied to the first set of cells and the second set of PSCs is applied to the second set of cells. The application of the first and second set of PSCs is configured to provide for maximum reuse distance of the PSCs and/or to minimize a potential interference level. In an example, a potential interference level can be determined by measuring a relative interference between two cells (e.g., via external tools, via measurements in the communications network, and so forth). In another example, a potential interference level can be determined by measuring the number of times a given cell site is "detected" by a mobile device that is measuring for neighbors.

Figure 17:
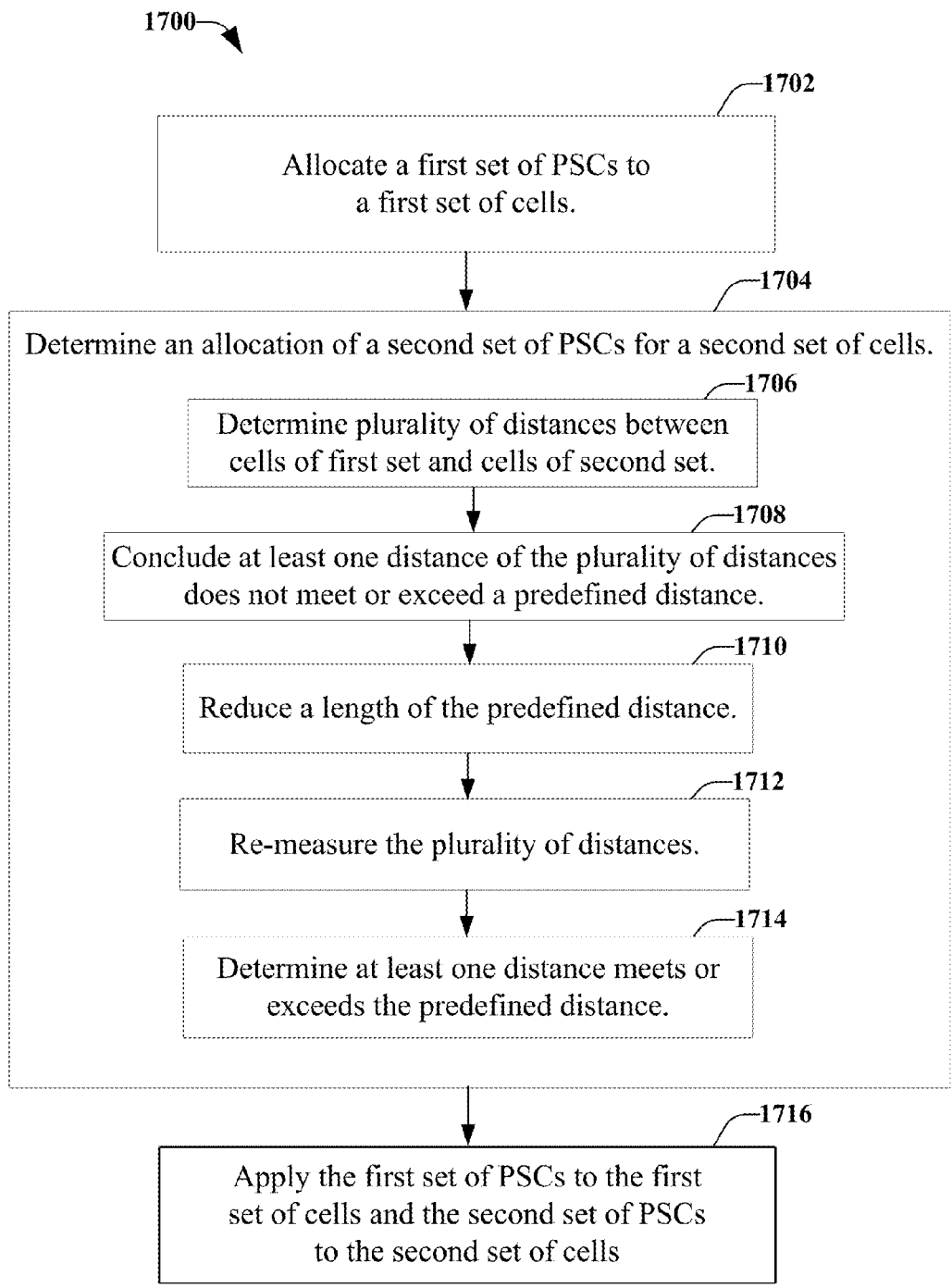
FIG. 17 illustrates an example, non-limiting method for adjusting a distance parameter during primary scrambling code reuse planning, according to an aspect.

FIG. 17 illustrates an example, non-limiting method 1700 for adjusting a distance parameter during primary scrambling code reuse planning, according to an aspect. At 1702, a first set of PSCs are allocated to a first set of cells. The first set of cells can be identified as being located in a portion of a wireless communications network that comprises at least a pre-defined number of cells. For example, the portion of the network can be the most densely populated cell area of the network, according to an aspect. At 1704, an allocation of a second set of PSCs for a second set of cells is determined. The second set of cells can be located at least in part in the portion of the network comprising at least the pre-defined number of cells.

According to an aspect, the determination includes, measuring, at 1706, a plurality of distances between cells of the first set of cells and cells of the second set of cells. At 1708, it is concluded that at least one distance of the plurality of distances does not satisfy a condition with respect to a pre-defined distance. Thus, at 1710, a length of the predefined distance is reduced.

After the predefined distance length is reduced, at 1712, the plurality of distances between cells of the first set of cells and cells of the second set of cells are re-measured. At 1714, it is determined that at least one distance of the plurality of distances satisfies a condition with respect to the predefined distance. At 1716, the first set of PSCs is applied to the first set of cells and the second set of PSCs is applied to the second set of cells.

Figure 18:
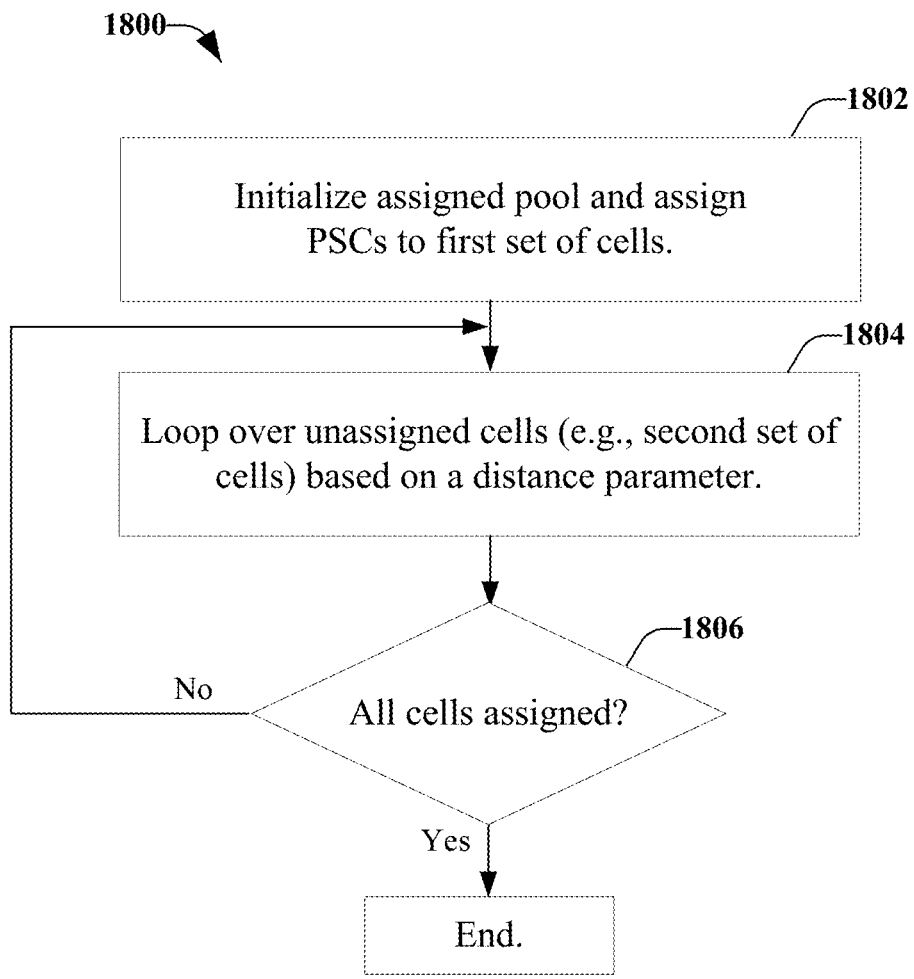
FIG. 18 illustrates a method for assigning primary scrambling codes, according to an aspect.

FIG. 18 illustrates a method for assigning primary scrambling codes, according to an aspect. Method starts, at 1802, when an assigned pool is initialized. The available PSCs are assigned to (or reserved for) a first set of cells, wherein one PSC is assigned to each cell. The first set of cells can be located in a portion of a network that comprises at least a pre-defined number of cells.

At 1804, all unassigned cells i are looped over in an order determined by a distance from the portion of the network that comprises at least the pre-defined number of cells and each of the unassigned cells. For example, if there exists any p, such that for all j x[j,p]=1, dist(i,j)>=min_dist, then set x[i,p]=1 and add cell i to the assigned pool. Where x(i,p)=1 if PSC p is assigned to cell i, otherwise x(i,p)=0; dist(i,j) is the distance between cell i and cell j; and min_dist is the pre-defined minimum PSC reuse distance.

Method 1800 continues, at 1806, with a determination whether all cells are assigned. If all cells are assigned ("YES"), method 1800 ends. If all cells are not assigned ("NO"), method 1800 continues at 1804. It is to be understood that looping all unassigned cells, at 1804, can be recursive and method 1800 can continue in such a manner until all cells are assigned.

Figure 19:
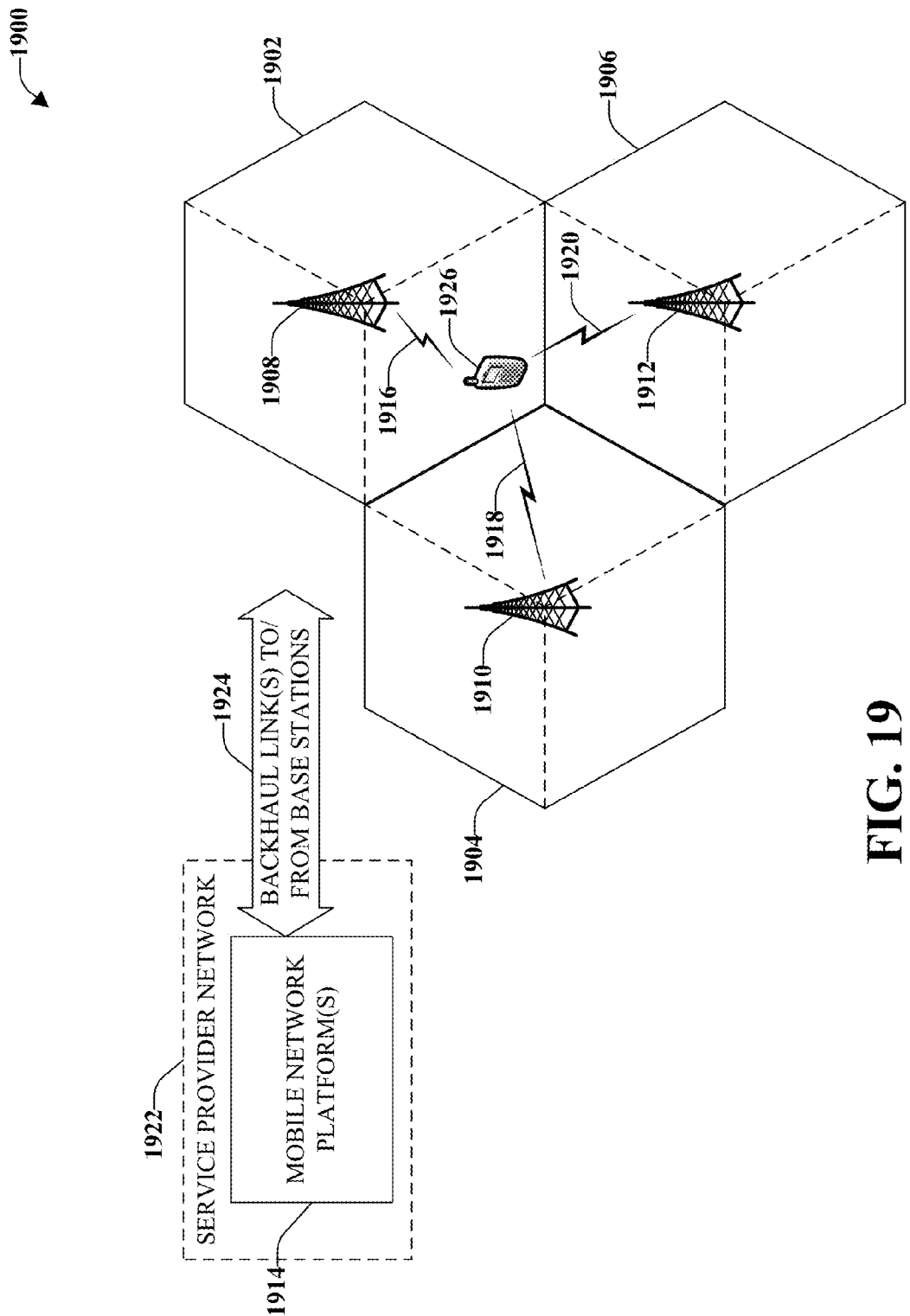
FIG. 19 illustrates a schematic example wireless environment that can operate in accordance with aspects described herein.

By way of further description with respect to one or more non-limiting ways to perform PSC planning, FIG. 19 is a schematic example wireless environment 1900 that can operate in accordance with aspects described herein. In particular, example wireless environment 1900 illustrates a set of wireless network macro cells. Three coverage macro cells 1902, 1904, and 1906 include the illustrative wireless environment; however, it is noted that wireless cellular network deployments can encompass any number of macro cells. Coverage macro cells 1902, 1904, and 1906 are illustrated as hexagons; however, coverage cells can adopt other geometries generally dictated by a deployment configuration or floor plan, geographic areas to be covered, and so on. Each macro cell 1902, 1904, and 1906 is sectorized in a 2π/3 configuration in which each macro cell includes three sectors, demarcated with dashed lines in FIG. 19. It is noted that other sectorizations are possible, and aspects or features of the disclosed subject matter can be exploited regardless of type of sectorization. Macro cells 1902, 1904, and 1906 are served respectively through base stations or eNodeBs 1908, 1910, and 1912. Any two eNodeBs can be considered an eNodeB site pair (NBSP). It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 1914, and set of base stations (e.g., eNode B 1908, 1910, and 1912) that serve a set of macro cells; electronic circuitry or components associated with the base stations in the set of base stations; a set of respective wireless links (e.g., links 1916, 1918, and 1920) operated in accordance to a radio technology through the base stations, form a macro radio access network (RAN). It is further noted that, based on network features, the radio controller can be distributed among the set of base stations or associated radio equipment. In an aspect, for UMTS-based networks, wireless links 1916, 1918, and 1920 embody a Uu interface (UMTS Air Interface).

Mobile network platform(s) 1914 facilitates circuit switched (CS)-based (e.g., voice and data) and packet-switched (PS) (e.g., internet protocol (IP), frame relay, or asynchronous transfer mode (ATM)) traffic and signaling generation, as well as delivery and reception for networked telecommunication, in accordance with various radio technologies for disparate markets. Telecommunication is based at least in part on standardized protocols for communication determined by a radio technology utilized for communication. In addition, telecommunication can exploit various frequency bands, or carriers, which include any EM frequency bands licensed by the service provider network 1922 (e.g., personal communication services (PCS), advanced wireless services (AWS), general wireless communications service (GWCS), and so forth), and any unlicensed frequency bands currently available for telecommunication (e.g., the 2.4 GHz industrial, medical and scientific (IMS) band or one or more of the 5 GHz set of bands). In addition, mobile network platform(s) 1914 can control and manage base stations 1908, 1910, and 1912 and radio component(s) associated thereof, in disparate macro cells 1902, 1904, and 1906 by way of, for example, a wireless network management component (e.g., radio network controller(s), cellular gateway node(s), etc.) Moreover, wireless network platform(s) can integrate disparate networks (e.g., femto network(s), Wi-Fi network(s), femto cell network(s), broadband network(s), service network(s), enterprise network(s), and so on). In cellular wireless technologies (e.g., 3rd Generation Partnership Project (3GPP) Universal Mobile Telecommunication System (UMTS), Global System for Mobile Communication (GSM)), mobile network platform 1914 can be embodied in the service provider network 1922.

In addition, wireless backhaul link(s) 1924 can include wired link components such as T1/E1 phone line; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). In an aspect, for UMTS-based networks, wireless backhaul link(s) 1924 embodies IuB interface.

It is noted that while example wireless environment 1900 is illustrated for macro cells and macro base stations, aspects, features and advantages of the disclosed subject matter can be implemented in microcells, picocells, femto cells, or the like, wherein base stations are embodied in home-based equipment related to access to a network.

Figure 20:
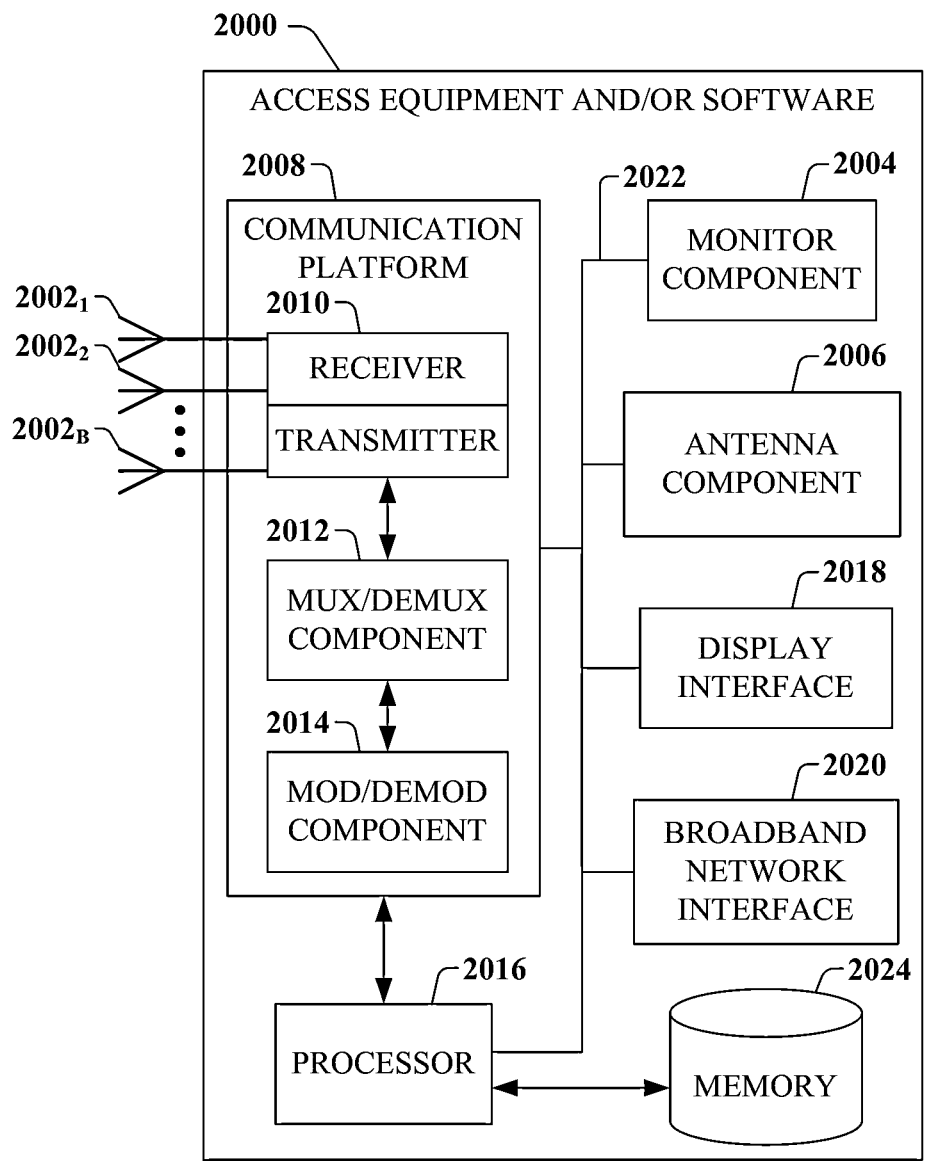
FIG. 20 illustrates a block diagram of access equipment and/or software related to access of a network, in accordance with an embodiment.

To provide further context for various aspects of the disclosed subject matter, FIG. 20 illustrates a block diagram of an embodiment of access equipment and/or software 2000 related to access of a network (e.g., base station, wireless access point, femtocell access point, and so forth) that can enable and/or exploit features or aspects of the disclosed aspects.

Access equipment and/or software 2000 related to access of a network can receive and transmit signal(s) from and to wireless devices, wireless ports, wireless routers, etc. through segments $2002_1$-$2002_B$ (B is a positive integer). Segments $2002_1$-$2002_B$ can be internal and/or external to access equipment and/or software 2000 related to access of a network, and can be controlled by a monitor component 2004 and an antenna component 2006. Monitor component 2004 and antenna component 2006 can couple to communication platform 2008, which can include electronic components and associated circuitry that provide for processing and manipulation of received signal(s) and other signal(s) to be transmitted.

In an aspect, communication platform 2008 includes a receiver/transmitter 2010 that can convert analog signals to digital signals upon reception of the analog signals, and can convert digital signals to analog signals upon transmission. In addition, receiver/transmitter 2010 can divide a single data stream into multiple, parallel data streams, or perform the reciprocal operation. Coupled to receiver/transmitter 2010 can be a multiplexer/demultiplexer 2012 that can facilitate manipulation of signals in time and frequency space. Multiplexer/demultiplexer 2012 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, multiplexer/demultiplexer component 2012 can scramble and spread information (e.g., codes, according to substantially any code known in the art, such as Hadamard-Walsh codes, Baker codes, Kasami codes, polyphase codes, and so forth).

A modulator/demodulator 2014 is also a part of communication platform 2008, and can modulate information according to multiple modulation techniques, such as frequency modulation, amplitude modulation (e.g., M-ary quadrature amplitude modulation (QAM), with M a positive integer); phase-shift keying (PSK); and so forth).

Access equipment and/or software 2000 related to access of a network also includes a processor 2016 configured to confer, at least in part, functionality to substantially any electronic component in access equipment and/or software 2000. In particular, processor 2016 can facilitate configuration of access equipment and/or software 2000 through, for example, monitor component 2004, antenna component 2006, and one or more components therein. Additionally, access equipment and/or software 2000 can include display interface 2018, which can display functions that control functionality of access equipment and/or software 2000, or reveal operation conditions thereof. In addition, display interface 2018 can include a screen to convey information to an end user. In an aspect, display interface 2018 can be an LCD (Liquid Crystal Display), a plasma panel, a monolithic thin-film based electrochromic display, and so on. Moreover, display interface 2018 can include a component (e.g., speaker) that facilitates communication of aural indicia, which can also be employed in connection with messages that convey operational instructions to an end user. Display interface 2018 can also facilitate data entry (e.g., through a linked keypad or through touch gestures), which can cause access equipment and/or software 2000 to receive external commands (e.g., restart operation).

Broadband network interface 2020 facilitates connection of access equipment and/or software 2000 to a service provider network (not shown) that can include one or more cellular technologies (e.g., 3GPP UMTS, GSM, and so on.) through backhaul link(s) (not shown), which enable incoming and outgoing data flow. Broadband network interface 2020 can be internal or external to access equipment and/or software 2000, and can utilize display interface 2018 for end-user interaction and status information delivery.

Processor 2016 can be functionally connected to communication platform 2008 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 2016 can be functionally connected, through data, system, or an address bus 2022, to display interface 2018 and broadband network interface 2020, to confer, at least in part, functionality to each of such components.

In access equipment and/or software 2000, memory 2024 can retain location and/or coverage area (e.g., macro sector, identifier(s)), access list(s) that authorize access to wireless coverage through access equipment and/or software 2000, sector intelligence that can include ranking of coverage areas in the wireless environment of access equipment and/or software 2000, radio link quality and strength associated therewith, or the like. Memory 2024 also can store data structures, code instructions and program modules, system or device information, code sequences for scrambling, spreading and pilot transmission, access point configuration, and so on. Processor 2016 can be coupled (e.g., through a memory bus), to memory 2024 in order to store and retrieve information used to operate and/or confer functionality to the components, platform, and interface that reside within access equipment and/or software 2000.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in memory 2024, non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited to including, these and any other suitable types of memory.

Figure 21:
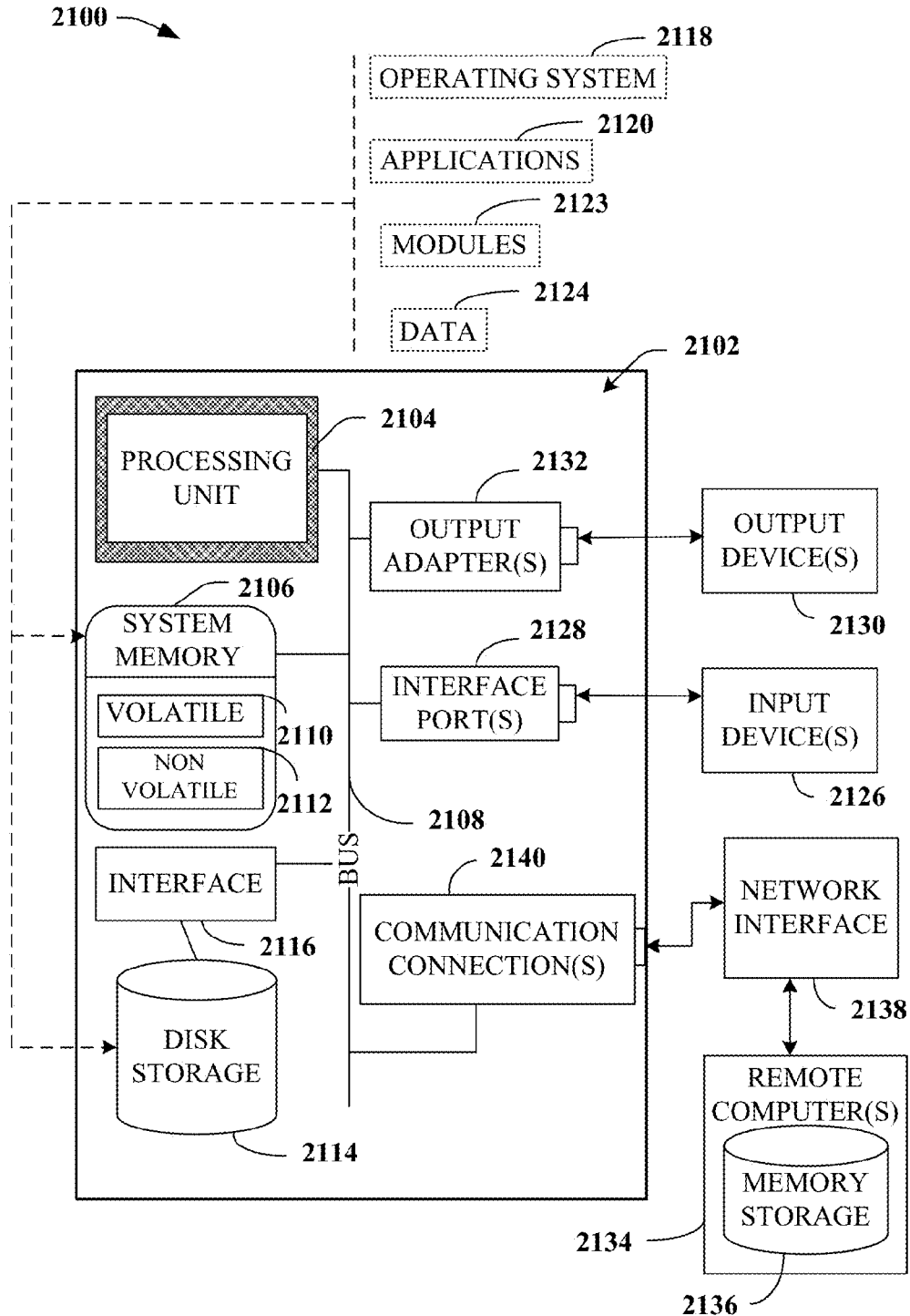
FIG. 21 illustrates a block diagram of a computing system, in accordance with an embodiment.

In order to provide a context for the various aspects of the disclosed subject matter, FIG. 21, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that perform particular tasks and/or implement particular abstract data types. For example, in memory (such as memory 202) there can be software, which can instruct a processor (such as processor 204) to perform various actions. The processor can be configured to execute the instructions in order to implement PSC planning as discussed herein.

Moreover, those skilled in the art will understand that the various aspects can be practiced with other computer system configurations, including single-processor or multiprocessor computer systems, mini-computing devices, mainframe computers, as well as personal computers, base stations hand-held computing devices or user equipment, such as a PDA, phone, watch, and so forth, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 21, a block diagram of a computing system 2100 operable to execute the disclosed systems and methods is illustrated, in accordance with an embodiment. Computer 2102 includes a processing unit 2104, a system memory 2106, and a system bus 2108. System bus 2108 couples system components including, but not limited to, system memory 2106 to processing unit 2104. Processing unit 2104 can be any of various available processors. Dual microprocessors and other multiprocessor architectures also can be employed as processing unit 2104.

System bus 2108 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1194), and Small Computer Systems Interface (SCSI).

System memory 2106 includes volatile memory 2110 and nonvolatile memory 2112. A basic input/output system (BIOS), containing routines to transfer information between elements within computer 2102, such as during start-up, can be stored in nonvolatile memory 2112. By way of illustration, and not limitation, nonvolatile memory 2112 can include ROM, PROM, EPROM, EEPROM, or flash memory. Volatile memory 2110 can include RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2102 also includes removable/non-removable, volatile/non-volatile computer storage media. In an implementation, the non-transitory computer-readable storage medium can store computer-executable instructions that, in response to execution, cause a system including a processor to perform operations. The operations can include identifying a portion of a network that comprises at least a pre-defined number of cells and assigning PSCs to a first set of cells in the portion of the network. The operations can also include evaluating a second set of cells in the portion of the network for reuse of the PSCs. The evaluating can be based on a minimum reuse distance and a coverage area of each cell. The operations can also include selectively applying the PSCs to the second set of cells as a result of the evaluating. A same PSC is applied to a first cell in the first set of cells and a second cell in the second set of cells.

In an aspect, the operations can include identifying at least one PSC based on a distance parameter for a current cell in the second set of cells, wherein the current cell is being evaluated for PSC reuse. In another aspect, the operations can include reassigning a PSC of the second cell if the second cell and the first cell are neighbors or are identified as neighbors by a third cell. According to another aspect, the operations can include locking PSC associated with a third set of cells, wherein the third set of cells are located outside the portion of the network.

FIG. 21 illustrates the removable/non-removable, volatile/non-volatile computer storage media as, for example, disk storage 2114. Disk storage 2114 includes, but is not limited to, devices such as a magnetic disk drive, floppy disk drive, tape drive, Jaz drive, Zip drive, LS-100 drive, flash memory card, or memory stick. In addition, disk storage 2114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2114 to system bus 2108, a removable or non-removable interface is typically used, such as interface component 2116.

It is to be noted that FIG. 21 describes software that acts as an intermediary between users and computer resources described in suitable operating environment. Such software includes an operating system 2118. Operating system 2118, which can be stored on disk storage 2114, acts to control and allocate resources of computer system 2102. System applications 2120 can take advantage of the management of resources by operating system 2118 through program modules 2122 and program data 2124 stored either in system memory 2106 or on disk storage 2114. It is to be understood that the disclosed subject matter can be implemented with various operating systems or combinations of operating systems.

A user can enter commands or information, for example through interface component 2116, into computer system 2102 through input device(s) 2126. Input devices 2126 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 2104 through system bus 2108 through interface port(s) 2128.

Interface port(s) 2128 include, for example, a serial port, a parallel port, a game port, and a universal serial bus (USB). Output device(s) 2130 use some of the same type of ports as input device(s) 2126.

Thus, for example, a USB port can be used to provide input to computer 2102 and to output information from computer 2102 to an output device 2130. Output adapter 2132 is provided to illustrate that there are some output devices 2130, such as monitors, speakers, and printers, among other output devices 2130, which use special adapters. Output adapters 2132 include, by way of illustration and not limitation, video and sound cards that provide means of connection between output device 2130 and system bus 2108. It is also noted that other devices and/or systems of devices provide both input and output capabilities such as remote computer(s) 2134.

Computer 2102 can operate in a networked environment using logical connections to one or more remote computers, such as remote computer(s) 2134. Remote computer(s) 2134 can be a personal computer, a server, a router, a network PC, a workstation, a microprocessor based appliance, a peer device, or other common network node and the like, and typically includes many or all of the elements described relative to computer 2102.

For purposes of brevity, only one memory storage device 2136 is illustrated with remote computer(s) 2134. Remote computer(s) 2134 is logically connected to computer 2102 through a network interface 2138 and then physically connected through communication connection 2140. Network interface 2138 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2140 refer(s) to hardware/software employed to connect network interface 2138 to system bus 2108. While communication connection 2140 is shown for illustrative clarity inside computer 2102, it can also be external to computer 2102. The hardware/software for connection to network interface 2138 can include, for example, internal and external technologies such as modems, including regular telephone grade modems, cable modems and DSL modems, ISDN adapters, and Ethernet cards.

It is to be noted that aspects, features, or advantages of the aspects described in the subject specification can be exploited in substantially any communication technology. For example, 4G technologies, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects disclosed herein can be exploited in legacy telecommunication technologies; e.g., GSM. In addition, mobile as well non-mobile networks (e.g., Internet, data service network such as IPTV) can exploit aspect or features described herein.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Other combinations of hardware and software or hardware and firmware can enable or implement aspects described herein, including disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., through access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components.

The term "set", "subset", or the like as employed herein excludes the empty set (e.g., the set with no elements therein). Thus, a "set", "subset", or the like includes one or more elements or periods, for example. As an illustration, a set of periods includes one or more periods; a set of transmissions includes one or more transmissions; a set of resources includes one or more resources; a set of messages includes one or more messages, and so forth.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A system, comprising:
   at least one memory that stores computer-executable instructions; and
   at least one processor, communicatively coupled to the at least one memory, that facilitates execution of the computer-executable instructions to at least:
      identify a segment of a wireless communications network for assignment of scrambling codes to a plurality of base stations located within the segment;
      determine a core of the segment, wherein the core is a portion of the segment comprising at least a pre-defined number of base stations;
      reserve a first set of scrambling codes of the scrambling codes for a first set of base stations of the plurality of base stations within the core;
      define a center for the segment;
      assign a second set of scrambling codes of the scrambling codes to a second set of base stations of the plurality of base stations in the segment, wherein the assignment is performed in an order based on distances of the second set of base stations from the center, and wherein a first base station in the first set of base stations and a second base station of the second set of base stations are assigned a same scrambling code; and
      convey the first set of scrambling codes and the second set of scrambling codes to the first set of base stations and the second set of base stations, respectively.

2. The system of claim 1, wherein the at least one processor further facilitates the execution of the computer-executable instructions to identify at least one primary scrambling code that satisfies a condition with respect to a distance parameter for each base station of the second set of base stations being evaluated.

3. The system of claim 2, wherein the at least one processor further facilitates the execution of the computer-executable instructions to decrease a length of the distance parameter in response to at least one base station from the second set of base stations failing to satisfy the condition with respect to the distance parameter.

4. The system of claim 1, wherein the at least one processor further facilitates the execution of the computer-executable instructions to identify at least one primary scrambling code of the scrambling codes that satisfies a condition with respect to a distance parameter and a coverage range for the first base station and the second base station.

5. The system of claim 1, wherein the at least one processor further facilitates the execution of the computer-executable instructions to reconfigure at least a portion of the scrambling code assignment in response to a determination that at least two base stations defined as neighbors share a common primary scrambling code.

6. The system of claim 1, wherein the at least one processor further facilitates the execution of the computer-executable instructions to reconfigure at least a portion of the scrambling code assignment in response to a determination that at least two base stations share a common primary scrambling code and are defined as neighbors of a third cell.

7. The system of claim 1, wherein the at least one processor further facilitates the execution of the computer-executable instructions to apply a restriction to a third set of scrambling codes assigned to a third set of base stations located outside a boundary of the segment of the wireless communications network.

8. The system of claim 7, wherein the at least one processor further facilitates the execution of the computer-executable instructions to bypass the assignment based on a distance between the third set of base stations and the second set of base stations.

9. The system of claim 1, wherein the at least one processor further facilitates the execution of the computer-executable instructions to assign base stations of the plurality of base stations on a same cell scrambling codes that conform to at most a pre-defined separation amount.

10. A method, comprising:
   determining, by a system comprising a processor, a first allocation of a first set of primary scrambling codes to a first set of base stations of a plurality of base stations located in a populated area of a wireless communications network having at least a pre-defined population;
   determining, by the system, a second allocation of a second set of primary scrambling codes for each base station of a second set of base stations of the plurality of base stations, wherein the determining is based on at least one of a distance between base stations of the plurality of base stations and a coverage area of each base station; and assigning by the system, the first set of primary scrambling codes to the first set of base stations and the second set of primary scrambling codes to the second set of base stations, wherein scrambling codes of the first set of primary scrambling codes are reused in the second set of primary scrambling codes.

11. The method of claim 10, wherein the determining the second allocation comprises:
evaluating, by the system, the distance between a first base station of the first set of base stations and a second base station of the second set of base stations;
determining, by the system, the distance is greater than a predefined distance; and
reserving a primary scrambling code assigned to the first base station for reuse by the second base station.

12. The method of claim 10, wherein the determining the second allocation comprises:
determining, by the system, the distance between the first base station of the first set of base stations and a second base station of the second set of base stations;
determining, by the system, that the distance is less than a predefined distance;
evaluating, by the system, a second distance between a third base station of the first set of base stations and the second base station;
determining, by the system, the second distance is greater than the predefined distance; and
reserving a primary scrambling code of the third base station for reuse by the second base station.

13. The method of claim 10, wherein the determining comprises:
measuring, by the system, a plurality of distances between first base stations of the first set of base stations and second base stations of the second set of base stations;
determining, by the system, that at least one distance of the plurality of distances does not satisfy a condition with respect to a predefined distance;
reducing a length of the predefined distance;
re-measuring, by the system, the plurality of distances between base stations of the first set of base stations and base stations of the second set of base stations; and
determining, by the system, at least one distance of the plurality of distances satisfies the condition with respect to the predefined distance.

14. The method of claim 10, further comprising:
identifying, by the system, that the first base station and a second base station are defined as neighbors share a same primary scrambling code; and
changing, by the system, the primary scrambling code of the first base station or the second base station.

15. The method of claim 10, further comprising:
identifying, by the system, that the first base station and a second base station are defined as neighbors by a third base station, wherein the first base station and the second base station are assigned a same primary scrambling code; and
changing, by the system, the primary scrambling code of the first base station or the second base station as a result of the identifying.

16. The method of claim 10, further comprising assigning base stations of the plurality of base stations on a same cell scrambling codes that conform to at most a pre-defined separation amount, wherein the base stations are located in geographic regions, wherein a geographic region is a cell.

17. A non-transitory computer-readable storage medium storing computer-executable instructions that, in response to execution, cause a system including a processor to perform operations, comprising:
identifying a portion of a network that comprises at least a pre-defined number of base stations;
assigning primary scrambling codes to a first set of base stations in the portion of the network;
evaluating a second set of base stations in the portion of the network for reuse of the primary scrambling codes, wherein the evaluating is based on a distance between base stations that are assigned a same scrambling code and a coverage area of each base station; and
selectively applying the primary scrambling codes to the second set of base stations as a result of the evaluating, wherein a same primary scrambling code is applied to a first base station in the first set of base stations and a second base station in the second set of base stations.

18. The non-transitory computer-readable storage medium of claim 17, wherein the operations further comprise:
identifying at least one primary scrambling code based on a distance parameter for each base station in the second set of base stations being evaluated for scrambling code reuse.

19. The non-transitory computer-readable storage medium of claim 17, wherein the operations further comprise:
reassigning a primary scrambling code of the second base station in response to the second base station and the first base station being neighbors or in response to a third base station identifying the second base station and the first base station as neighbors.

20. The non-transitory computer-readable storage medium of claim 17, wherein the operations further comprise:
bypass processing of scrambling codes associated with a third set of base stations, wherein the third set of base stations are located outside the portion of the network.

* * * * *